(12) United States Patent
Matsuzaki

(10) Patent No.: US 9,007,876 B2
(45) Date of Patent: Apr. 14, 2015

(54) ELECTRONIC TIMEPIECE

(71) Applicant: Seiko Epson Corporation, Tokyo (JP)

(72) Inventor: Jun Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/458,480

(22) Filed: Aug. 13, 2014

(65) Prior Publication Data
US 2015/0063078 A1 Mar. 5, 2015

(30) Foreign Application Priority Data

Aug. 29, 2013 (JP) ................................ 2013-178632
Jun. 24, 2014 (JP) ................................ 2014-129466

(51) Int. Cl.
*G04R 20/02* (2013.01)
*G04R 20/04* (2013.01)
*G04G 19/00* (2006.01)
*G01S 19/29* (2010.01)
*G04R 20/06* (2013.01)
*G01S 19/25* (2010.01)

(52) U.S. Cl.
CPC ................ *G04R 20/02* (2013.01); *G04G 19/00* (2013.01); *G04R 20/06* (2013.01); *G01S 19/256* (2013.01); *G04R 20/04* (2013.01)

(58) Field of Classification Search
CPC ........ G04R 20/02; G04R 20/04; G04R 20/06; G04G 19/00; G01S 19/256

USPC ............................ 368/47; 342/357.22, 357.68
See application file for complete search history.

(56) References Cited

U.S. PATENT DOCUMENTS

| | | | |
|---|---|---|---|
| 7,983,116 B2 * | 7/2011 | Fujisawa | 368/47 |
| 8,094,066 B2 * | 1/2012 | Mizuochi | 342/357.28 |
| 8,169,857 B2 * | 5/2012 | Matsuzaki | 368/47 |
| 8,432,771 B2 * | 4/2013 | Matsuzaki | 368/47 |
| 2010/0176988 A1 * | 7/2010 | Maezawa et al. | 342/357.05 |
| 2011/0044137 A1 | 2/2011 | Matsuzaki | |
| 2011/0235687 A1 * | 9/2011 | Mizuochi | 375/150 |
| 2014/0072017 A1 * | 3/2014 | Gobara | 375/150 |

FOREIGN PATENT DOCUMENTS

| | | |
|---|---|---|
| JP | 2011-038988 | 2/2011 |
| JP | 2011-038989 | 2/2011 |

* cited by examiner

*Primary Examiner* — Vit W Miska

(57) ABSTRACT

An electronic timepiece includes a GPS receiving section, which captures a satellite signal emitted from a positional information satellite and receives the satellite signal, and is capable of obtaining at least one of time information and positioning information, and a reception mode setting section adapted to set a reception mode selectively to at least a time measurement mode and a positioning mode. The GPS receiving section is provided with a base band section as a correlation section, and the correlation section is capable of changing the frequency resolution in a plurality of levels. Further, the correlation section sets the minimum value of the frequency resolution to be changed in the time measurement mode to a value larger than the minimum value of the frequency resolution to be changed in the positioning mode.

9 Claims, 13 Drawing Sheets

ELECTRONIC TIMEPIECE

BACKGROUND

1. Technical Field

The present invention relates to an electronic timepiece for receiving a satellite signal from positional information satellites such as GPS satellites to obtain the current date and time.

2. Related Art

In the global positioning system (GPS) as a system for positioning a self-location, there are used GPS satellites each having an orbit circling around the earth. Further, a GPS device for receiving the satellite signals transmitted from the GPS satellites to obtain the time information and the positional information based on navigation messages included in the satellite signals, and then performing a time correction process and a process for positioning the self-location has been put to practical use.

In a capturing process of the satellite signal transmitted from the GPS satellite, it is common to provide a threshold value for a correlation value or a signal intensity, and receive the satellite signal with a signal level equal to or higher than the threshold value to determine whether or not a subsequent synchronization process and a NAV data decode process can be performed. Thus, it is possible to receive a signal with a quality radio waveform hardly affected by noise or the like, and it becomes possible to improve positioning accuracy and date-time correction accuracy.

Then, in the electronic timepiece configured to be able to switch between a time measurement mode for obtaining the time information and a positioning mode for obtaining the positional information to calculate the location of the electronic timepiece, there has been known a device having the threshold value of the signal intensity in the time measurement mode set to be lower than in the positioning mode (see JP-A-2011-38989 (Document 1)).

The device of Document 1 is capable of capturing the satellite signal low in signal intensity in the time measurement mode, and can therefore shorten the time for capturing the satellite signal. Therefore, the time information can quickly be obtained, and thus the power consumption can also be reduced.

The device of Document 1 described above can shorten the time until the capture of the satellite signal in the case of performing the receiving process in the state in which the electronic timepiece is stationary. However, there has been found out a new problem that in the case in which the user wearing the electronic timepiece is moving, the time until the capture of the satellite signal cannot be shortened in some cases.

SUMMARY

An advantage of some aspects of the invention is to provide an electronic timepiece capable of reducing the time until the capture of the satellite signal when receiving the time information while moving.

An electronic timepiece according to an aspect of the invention includes a receiving section, which captures a satellite signal emitted from a positional information satellite and receives the satellite signal, and is capable of obtaining at least one of time information and positioning information, and a reception mode setting section adapted to selectively set a reception mode of the receiving section to at least a time measurement mode for obtaining the time information based on the satellite signal received, and a positioning mode for obtaining the positioning information and the time information based on the satellite signal received, the receiving section is provided with a correlation section adapted to perform a capture process of obtaining a correlation between a local code used to capture the satellite signal and the satellite signal received, the correlation section is configured so that a frequency resolution, with which a predetermined frequency band is searched for a carrier frequency of the satellite signal, can be changed in a plurality of levels, and a minimum value of the frequency resolution to be changed by the correlation section in a case in which the reception mode is set to the time measurement mode is set to a value larger than a minimum value of the frequency resolution to be changed by the correlation section in a case in which the reception mode is set to the positioning mode.

According to this aspect of the invention, the correlation section for obtaining the correlation for capturing the satellite signal performs a search while changing the frequency with the frequency resolution thus set in order to cope with the frequency fluctuation due to the Doppler effect of the satellite signal. On this occasion, the correlation section sets the minimum value of the frequency resolution to be changed in the time measurement mode to a larger value compared to the minimum value in the positioning mode. For example, in the case in which the correlation section is configured to be able to change the frequency resolution in four levels of 150 Hz, 75 Hz, 10 Hz, and 2 Hz, and the frequency resolution is changed to the four levels in the positioning mode, the correlation section changes the frequency resolution in three levels of, in the time measurement mode for example, 150 Hz, 75 Hz, and 10 Hz to thereby perform the control so that the minimum value (10 Hz) thereof becomes larger than the minimum value (2 Hz) in the positioning mode.

Further, in the case of searching the same frequency band, the smaller the value of the frequency resolution is, the longer the search time becomes. For example, in the case in which the frequency band of the search target is ±8 kHz, if the frequency resolution is 10 Hz, it results that the search process is repeated 16000/10=1600 times, but if the frequency resolution is 2 Hz, which is a value smaller than 10 Hz, it is necessary to perform the search process 1600/2=8000 times, and the process time in the case of 2 Hz becomes 5 times as long as that in the case of 10 Hz. Therefore, in comparison between the case in which the search process is performed in the time measurement mode with the same frequency resolution as in the positioning mode and the aspect of the invention, the average time taken to capture the satellite can be shortened in the case of the aspect of the invention, and the acquisition probability of the time information can be raised.

Specifically, if it takes long time to search for the positional information satellites with the satellite numbers 1 through 32, the possibility of failing to capture the satellites increases due to a condition in which, for example, the positional information satellite, which can be captured, hides behind a building while walking. In contrast, if the search time is short, the possibility that the positional information satellite, which can be captured, can be captured before the satellite hides behind the building while walking is increased. Therefore, by setting the minimum value of the frequency resolution in the time measurement mode to be larger than that in the positioning mode, in other words, by preventing the minimum value of the frequency resolution, which can be changed in a plurality of levels, from being selected in the time measurement mode, the average time taken to capture the satellite can be shortened, and the acquisition probability of the time information can also be increased. Therefore, the receiving time in the time measurement mode can be shortened to reduce the power consumption, and thus the operating time of the battery-driven electronic timepiece such as a watch can be elongated.

In the electronic timepiece according to the aspect of the invention described above, it is preferable that assuming that the satellite signal having a signal intensity one of equal to and higher than a signal reception threshold value is a capture target, n denotes an integer no smaller than two, and m denotes an integer no smaller than one and no larger than n, the correlation section is configured so that the frequency resolution can be changed in n levels from a first frequency resolution $\Delta f1$ as a maximum value to an $n^{th}$ frequency resolution $\Delta fn$ as a minimum value, and the signal reception threshold value can be changed in n levels from a first signal reception threshold value Th1 as a maximum value to an $n^{th}$ signal reception threshold value Thn as a minimum value, in a case in which the reception mode is set to the time measurement mode, the correlation section continues the capture process while changing a search state in m levels from a first search state in which the frequency resolution is set to the first frequency resolution $\Delta f1$, and the signal reception threshold value is set to the first signal reception threshold value Th1 to an $m^{th}$ search state in which the frequency resolution is set to the $m^{th}$ frequency resolution $\Delta fm$, which is larger than the $n^{th}$ frequency resolution $\Delta fn$, and the signal reception threshold value is set to the $m^{th}$ signal reception threshold value Thm, which is higher than the $n^{th}$ signal reception threshold value Thn until a capture termination condition of the satellite signal is fulfilled, and in a case in which the capture termination condition of the satellite signal fails to be fulfilled when the capture process in the $m^{th}$ search state ends, the correlation section repeats the capture process from the first search state.

In the case of, for example, n=4 and m=3, the correlation section is set to be able to change the frequency resolution in four levels from the first frequency resolution $\Delta f1$ to the fourth frequency resolution $\Delta f4$, and change the signal reception threshold value Th in four levels from the first signal reception threshold value Th1 to the fourth signal reception threshold value Th4.

Further, in the time measurement mode, the correlation section changes the search state in three levels including the first search state (set to the first frequency resolution $\Delta f1$, the first signal reception threshold value Th1), the second search state (set to the second frequency resolution $\Delta f2$, the second signal reception threshold value Th2), and the third search state (set to the third frequency resolution $\Delta f3$, the third signal reception threshold value Th3). In other words, in the time measurement mode, setting to the fourth search state (set to the fourth frequency resolution $\Delta f4$, the fourth signal reception threshold value Th4) is not performed.

Further, since the values $\Delta f1$ through $\Delta f4$ of the frequency resolution descend in this order, the capture process time in each of the first through third search states is short compared to the capture process time in the fourth search state. Therefore, compared to the case of performing the process in all of the first through fourth search states in the time measurement mode, the aspect of the invention repeating the first through third search states can shorten the average time taken to capture the satellite, and can increase the acquisition probability of the time information. Therefore, the receiving time in the time measurement mode can be shortened to reduce the power consumption, and thus the operating time of the battery-driven electronic timepiece such as a watch can be elongated. Moreover, since the signal reception threshold value is also changed in accordance with the frequency resolution, the satellite signal can more appropriately be captured.

In the electronic timepiece according to the aspect of the invention described above, it is preferable that assuming that the satellite signal having a signal intensity one of equal to and higher than a signal reception threshold value is a capture target, n denotes an integer no smaller than two, and m denotes an integer no smaller than one and no larger than n, the correlation section is configured so that the frequency resolution can be changed in n levels from a first frequency resolution $\Delta f1$ as a maximum value to an $n^{th}$ frequency resolution $\Delta fn$ as a minimum value, and the signal reception threshold value can be changed in n levels from a first signal reception threshold value Th1 as a maximum value to an $n^{th}$ signal reception threshold value Thn as a minimum value, in a case in which the reception mode is set to the time measurement mode, the correlation section continues the capture process while fixing the frequency resolution to the $m^{th}$ frequency resolution $\Delta fm$, and changing a search state in n levels from a first search state in which the signal reception threshold value is set to the first signal reception threshold value Th1 to an $n^{th}$ search state in which the signal reception threshold value is set to the $n^{th}$ signal reception threshold value Thn until a capture termination condition of the satellite signal is fulfilled, and in a case in which the capture termination condition of the satellite signal fails to be fulfilled when the capture process in the $n^{th}$ search state ends, the correlation section repeats the capture process from the first search state.

In the case of, for example, n=4 and m=2, in the time measurement mode, the correlation section performs the satellite capture process in the first through fourth search states while fixing the frequency resolution to the second frequency resolution $\Delta f2$, and changing the signal reception threshold value Th in four levels from the first signal reception threshold value Th1 to the fourth signal reception threshold value Th4.

Further, since the frequency resolution is fixed to $\Delta f2$, the capture process time in each of the first through fourth search states is short compared to the case in which the frequency resolution is changed to each of $\Delta f1$ through $\Delta f4$. Therefore, according to the aspect of the invention, the average time taken to capture the satellite can be shortened, and the acquisition probability of the time information can also be raised. Therefore, the receiving time in the time measurement mode can be shortened to reduce the power consumption, and thus the operating time of the battery-driven electronic timepiece such as a watch can be elongated.

In the electronic timepiece according to the aspect of the invention described above, it is preferable that assuming that the satellite signal having a signal intensity one of equal to and higher than a signal reception threshold value is a capture target, n denotes an integer no smaller than two, and m denotes an integer no smaller than one and no larger than n, the correlation section is configured so that the frequency resolution can be changed in n levels from a first frequency resolution $\Delta f1$ as a maximum value to an $n^{th}$ frequency resolution $\Delta fn$ as a minimum value, and the signal reception threshold value can be changed in n levels from a first signal reception threshold value Th1 as a maximum value to an $n^{th}$ signal reception threshold value Thn as a minimum value, in a case in which the reception mode is set to the time measurement mode, the correlation section continues the capture process while fixing the signal reception threshold value to the $m^{th}$ signal reception threshold value Thm, and changing a search state in m levels from a first search state in which the frequency resolution is set to the first frequency resolution $\Delta f1$ to an $m^{th}$ search state in which the frequency resolution is set to the $m^{th}$ frequency resolution $\Delta fm$, which is larger than the $n^{th}$ frequency resolution $\Delta fn$, until a capture termination condition of the satellite signal is fulfilled, and in a case in which the capture termination condition of the satellite signal fails to be fulfilled when the capture process in the $m^{th}$ search state ends, the correlation section repeats the capture process from the first search state.

In the case of, for example, n=4 and m=3, in the time measurement mode, the correlation section performs the satellite capture process in the first through third search states while fixing the signal reception threshold value Th to the third signal reception threshold value Th3, and changing the frequency resolution in three levels from the first frequency resolution $\Delta f1$ to the third frequency resolution $\Delta f3$.

Further, the capture process time in each of the first through third search states is short compared to the case in which the frequency resolution is changed to each of $\Delta f1$ through $\Delta f4$. Therefore, according to the aspect of the invention, the average time taken to capture the satellite can be shortened, and the acquisition probability of the time information can also be raised. Therefore, the receiving time in the time measurement mode can be shortened to reduce the power consumption, and thus the operating time of the battery-driven electronic timepiece such as a watch can be elongated.

Here, it is preferable that in a case in which the reception mode is set to the positioning mode, the correlation section continues the capture process while changing the search state in n levels from the first search state in which the frequency resolution is set to the first frequency resolution $\Delta f1$, and the signal reception threshold value is set to the first signal reception threshold value Th1 to an $n^{th}$ search state in which the frequency resolution is set to the $n^{th}$ frequency resolution $\Delta fn$, and the signal reception threshold value is set to the $n^{th}$ signal reception threshold value Thn until the capture termination condition of the satellite signal is fulfilled, and in a case in which the capture termination condition of the satellite signal fails to be fulfilled when the capture process in the $n^{th}$ search state ends, the correlation section repeats the capture process from the first search state.

In the case of, for example, n=4, in the positioning mode, the correlation section performs the capture process while changing the search state in four levels including the first search state (set to the first frequency resolution $\Delta f1$, the first signal reception threshold value Th1), the second search state (set to the second frequency resolution $\Delta f2$, the second signal reception threshold value Th2), the third search state (set to the third frequency resolution $\Delta f3$, the third signal reception threshold value Th3), and the fourth search state (set to the fourth frequency resolution $\Delta f4$, the fourth signal reception threshold value Th4). Therefore, since the probability that the satellite signal low in signal intensity can be captured is increased, the possibility that the necessary number of satellite signals for the positioning process can be captured is also increased. Therefore, the acquisition probability of the positional information can also be raised. In particular in the positioning mode, in general, since the user performs the receiving process while setting the electronic timepiece in a stationary state without moving inmost cases, the average time taken to capture the satellite can be shortened and the acquisition probability of the positional information can be raised compared to the case of performing the capture process while moving.

Further it is preferable that the reception mode setting section is configured so as to be able to set the reception mode of the receiving section to a date reception mode for obtaining date information and a leap second information acquisition mode for obtaining leap second information in addition to the time measurement mode and the positioning mode, and in a case in which the reception mode is set to one of the date reception mode and the leap second acquisition mode, the correlation section performs the same capture process as in the case in which the reception mode is set to the positioning mode.

In the case of the GPS satellite signal, the time information can be received every about 6 seconds, while the date information can only be received every 30 seconds, and the leap second information can only be received every 12.5 second, and therefore, the receiving process similar to that performed in the case of obtaining the positional information becomes necessary. Therefore, by adopting the same process as in the positioning mode to the capture process of the satellite signal, the acquisition probability of the date information and the leap second information can be improved.

An electronic timepiece according to another aspect of the invention includes a receiving section, which captures a satellite signal emitted from a positional information satellite and receives the satellite signal, and is capable of obtaining at least one of time information and positioning information, and a reception mode setting section adapted to set a reception mode of the receiving section to at least a time measurement mode of obtaining time information based on the satellite signal received, the receiving section is provided with a correlation section adapted to perform a capture process of obtaining a correlation between a local code used to capture the satellite signal and the satellite signal received, the correlation section is configured so that a frequency resolution, with which a predetermined frequency band is searched for a carrier frequency of the satellite signal, can be changed in a plurality of levels, and a minimum value of the frequency resolution to be changed by the correlation section in a case in which the reception mode is set to the time measurement mode is set to a value larger than a smallest settable value of the frequency resolution.

According to this aspect of the invention, in the case in which the correlation section is configured to be able to set the frequency resolution in four levels of 150 Hz, 75 Hz, 10 Hz, and 2 Hz, in the time measurement mode, the correlation section changes the frequency resolution in three levels of, for example, 150 Hz, 75 Hz, and 10 Hz to thereby perform the control so that the minimum value (10 Hz) thereof becomes higher than the settable smallest value (2 Hz).

Therefore, in the time measurement mode, according to the aspect of the invention, the average time taken to capture the satellite can be shortened and the acquisition probability of the time information can be raised compared to the case in which the frequency resolution is changed to the settable smallest value (2 Hz). Therefore, the receiving time in the time measurement mode can be shortened to reduce the power consumption, and thus the operating time of the battery-driven electronic timepiece such as a watch can be elongated.

In the electronic timepiece according to the aspect of the invention described above, it is preferable that the correlation section is configured so as to be able to change the frequency resolution in four levels including a first setting value, a second setting value smaller than the first setting value, a third setting value smaller than the second setting value, and a fourth setting value smaller than the third setting value, in a case in which the reception mode is set to the time measurement mode, the correlation section performs the capture process while changing the frequency resolution sequentially to the first setting value, the second setting value, and the third setting value in this order until a capture termination condition of the satellite signal is fulfilled, and in a case in which the capture termination condition of the satellite signal fails to be fulfilled when the capture process with the third setting value ends, the correlation section repeats the capture process from a state in which the frequency resolution is set to the first setting value.

According to this aspect of the invention, in the case in which the correlation section is configured to be able to set the frequency resolution in four levels of first through fourth setting values, the correlation section performs the control in the time measurement mode so that the frequency resolution is changed in three levels, and is not changed to the fourth setting value as the minimum value.

Therefore, in the time measurement mode, according to the aspect of the invention, the average time taken to capture the satellite can be shortened and the acquisition probability of the time information can be raised compared to the case in which the frequency resolution is changed to the fourth setting value as the settable smallest value. Therefore, the receiving time in the time measurement mode can be shortened to reduce the power consumption, and thus the operating time of the battery-driven electronic timepiece such as a watch can be elongated.

In the electronic timepiece according to the aspect of the invention described above, it is preferable that there are further included a solar cell adapted to receive light to generate electric power, and a power generation amount detector adapted to detect a power generation amount in the solar cell, and the receiving section begins the capture process of the satellite signal in the time measurement mode in a case in which the power generation amount detected by the power generation amount detector is no smaller than a predetermined value.

In the case in which the power generation amount due to the solar cell is equal to or larger than a predetermined value, it is possible to determine that the solar cell is irradiated with the sunlight, and it can be assumed that the electronic timepiece is disposed outdoors. Therefore, the probability that the satellite signal can be received is raised, and it is possible to improve the probability that the receiving process in the time measurement mode only requiring to capture at least one satellite signal becomes successful.

Further, in the case of a typical watch, since the user moves outdoors once a day for commuting or the like, the receiving process in the time measurement mode can be performed at least once a day. Therefore, the display time of the electronic timepiece can be corrected with the time information thus received to keep the time accuracy in a high level.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained in detail with reference to the accompanying drawings and so on.

Figure 1:
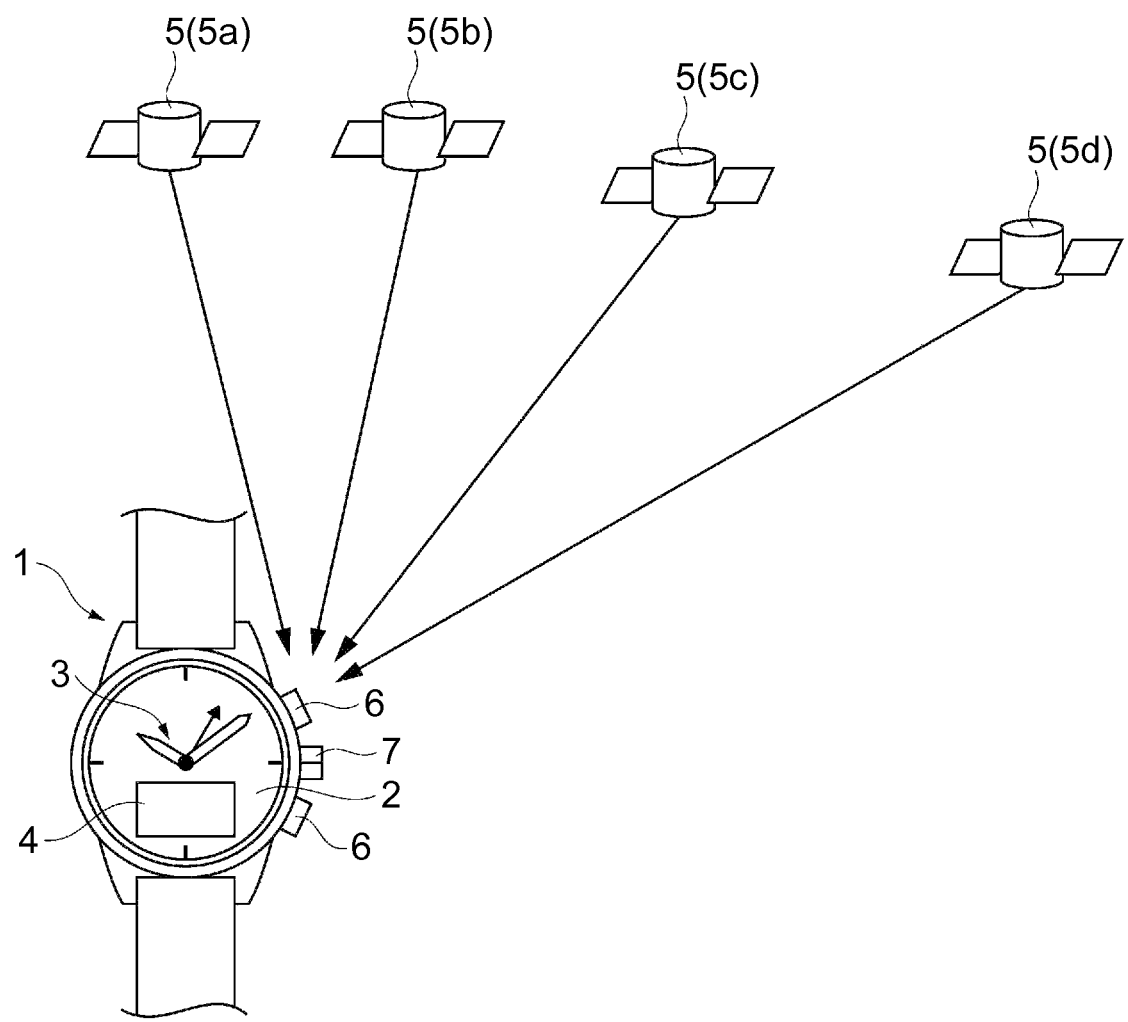
FIG. 1 is a schematic diagram showing a watch with a GPS as an electronic timepiece according to a first embodiment of the invention.

FIG. 1 is a schematic diagram showing a watch 1 (hereinafter referred to as a "GPS watch 1") with a GPS satellite signal receiving device as the electronic timepiece according to the invention.

As shown in FIG. 1, the GPS watch 1 is provided with a display device formed of a dial 2 and hands 3. A part of the dial 2 is provided with an opening, and a display 4 formed of an LCD display panel or the like is embedded in the opening. Therefore, the GPS watch 1 is a combination watch provided with the hands 3 and the display 4.

The hands 3 is configured including a second hand, a minute hand, an hour hand, and is driven by a stepping motor via gear wheels.

The display 4 is formed of the LCD display panel or the like, and is arranged to be able to display the current time, message information, and so on in addition to display time difference information as described above.

Further, the GPS watch 1 is configured so as to be able to receive the satellite signals from a plurality of GPS satellites 5 each circling with a predetermined orbit in the midair of the earth to obtain satellite time information, and then correct internal time information, or display the positioning information, namely the current location on the display 4.

Further, the GPS watch 1 is provided with buttons 6 and a stem 7 constituting an input device according to the invention.

The GPS satellites 5 (5a, 5b, 5c, and 5d) each circle on a predetermined orbit in the midair of the earth, and superimpose the navigation message on a microwave (LI wave) at 1.57542 GHz, and then transmit it toward the ground. Here, the GPS satellites 5 are an example of the positional information satellite in the invention, and the microwave (hereinafter referred to as a "satellite signal") at 1.57542 GHz on which the navigation message is superimposed is an example of the satellite signal in the invention.

Currently, 32 GPS satellites 5 exist, and in order to identify which GPS satellite 5 has transmitted the satellite signal, the GPS satellites 5 each superimpose a unique pattern of 1023 chip (period of 1 ms) called a coarse/acquisition code (C/A code) on the satellite signal. The C/A code is a pseudo random noise code (PRN code), and looks like a random pattern since each chip is set to either one of +1 and −1. Therefore, by calculating the correlation between the satellite signal and the pattern of each of the C/A codes, the C/A code superimposed on the satellite signal can be detected.

Here, a rough outline of the satellite signal (the navigation message) transmitted from each of the GPS satellites 5 will be explained.

Figure 2A:
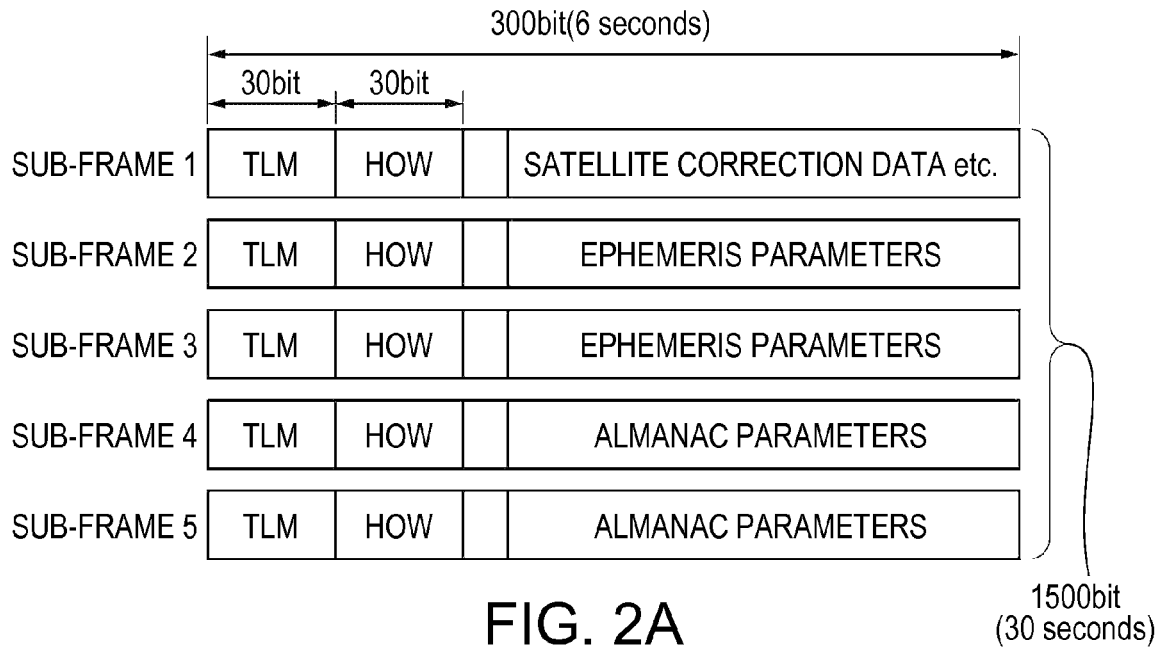
FIGS. 2A through 2C are schematic configuration diagrams for explaining a configuration of a satellite signal (a navigation message) transmitted from a GPS satellite.
Figure 2B:
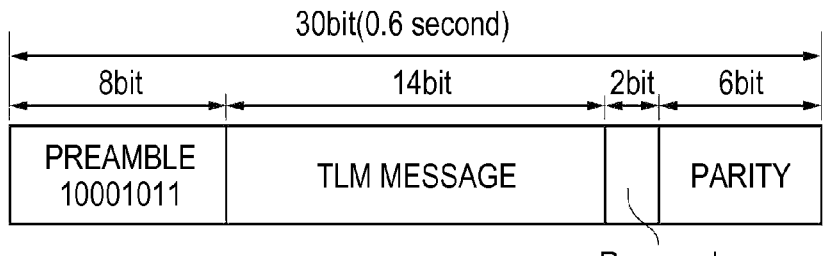
Figure 2C:
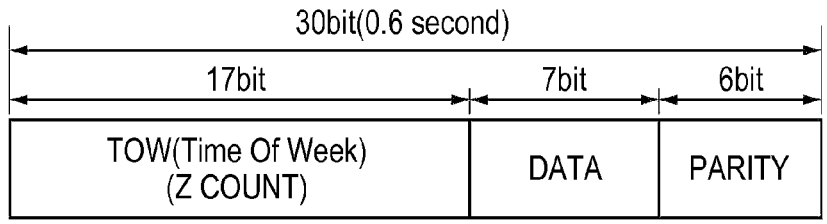

FIGS. 2A through 2C are schematic configuration diagrams for explaining a configuration of the satellite signal (the navigation message) transmitted from each of the GPS satellites 5.

As shown in FIG. 2A, the navigation message is configured as data having a main frame of totally 1500 bits as a unit. The main frame is divided into five sub-frames 1 through 5 each composed of 300 bits. The data of one sub-frame is transmitted from each of the GPS satellites 5 in 6 seconds. Therefore, the data of one main frame is transmitted from each of the GPS satellites 5 in 30 seconds.

The sub-frame 1 includes satellite correction data such as week number data. The week number data (date information) corresponds to the date information representing the week including the current GPS time information. The origin of the GPS time information is 00:00:00 on Jan. 6, 1980 in UTC (Coordinate Universal Time), and the week starting on the day has the week number of 0. The week number data is updated by week.

The sub-frames 2 and 3 include ephemeris parameters (detailed orbit information of each of the GPS satellites 5). Further, sub-frames 4 and 5 include almanac parameters (approximate orbit information of all of the GPS satellites 5).

Further, the sub-frames 1 through 5 each include a telemetry (TLM) word storing telemetry word (TLM) data of 30 bits from the head, and a HOW word storing hand over word (HOW) data of 30 bits.

Therefore, the TLM word and the HOW word are transmitted from the GPS satellites 5 at intervals of 6 seconds, while the satellite correction data such as the week number data, the ephemeris parameters, and the almanac parameters are transmitted at intervals of 30 seconds.

As shown in FIG. 2B, the TLM word includes preamble data, a TLM message, a reserved bit, and parity data.

As shown in FIG. 2C, the HOW word includes the GPS time information called TOW (time of week, also referred to as a "Z count"). It should be noted that the time information in the invention denotes the Z count data included in the GPS time information. The Z count data is arranged to display the elapsed time from midnight of every Sunday by second, and return to 0 at midnight of next Sunday. In other words, the Z count data is the second-scale information presented by week from the beginning of a week. The Z count data represents the GPS time information when the first bit of the subsequent sub-frame data will be transmitted. For example, the Z count data of the sub-frame 1 represents the GPS time information when the first bit of the sub-frame 2 will be transmitted. Further, the HOW word also includes three-bit data (an ID code) representing an ID of the sub-frame. Specifically, the HOW words of the sub-frames 1 through 5 shown in FIG. 2A respectively include the ID codes of "001," "010," "011," "100," and "101."

In general, the GPS receiver can obtain the GPS time information by obtaining the week number data included in the sub-frame 1 and the HOW word (the Z count data) included in each of the sub-frames 1 through 5. It should be noted that in the case in which the GPS receiver has previously obtained the week number data and has been internally counting the elapsed time from the moment when the week number data has been obtained, the GPS receiver can obtain the current week number data of the GPS satellite without obtaining the week number data. Therefore, the GPS receiver is arranged to be aware of the current time other than the date by obtaining the Z count data. Therefore, the GPS receiver normally obtains only the Z count data, which is the time information, as the current time.

It should be noted that the TLM word, the HOW word (the Z count data), the satellite correction data, the ephemeris parameters, the almanac parameters, and so on are an example of the satellite information in the invention.

In the GPS watch 1, it is meant that in the time measurement mode for performing the time measurement process, the Z count data as the time information is obtained. The Z count data can also be obtained from one GPS satellite 5. Further, the Z count data is included in each of the sub-frames, and is therefore transmitted at intervals of 6 seconds.

Therefore, in the reception in the time measurement mode, the number of captured satellites is at least one, required reception time for obtaining one Z count datum is 6 seconds at the longest, obtainable information is the Z count data, and the ephemeris parameters and the almanac parameters need not be received. Therefore, regarding the required reception time, one Z count datum can be obtained in 6 seconds, and even in the case of obtaining two through three Z count data for verification of the received data, the reception can be complete in a period as short as 12 through 18 seconds.

Therefore, in the time measurement mode, since it is sufficient to obtain the Z count data out of the satellite signal, even the satellite signal weak in signal intensity is hardly affected by noise, and therefore, highly reliable information can be obtained.

In contrast, the reception in the positioning mode means that the ephemeris parameters as the orbit information (the positioning information) of each of the GPS satellites 5 are received from at least three satellites. This is because it is necessary to obtain the ephemeris parameters from at least three GPS satellites 5 for positioning. It should be noted that the ephemeris parameters are included in the sub-frames 2 and 3, and can therefore be obtained by performing the reception (the reception of the sub-frames 1 through 3) for seconds at the shortest. Therefore, in the case of performing the reception while simultaneously capturing a plurality of GPS satellites 5, it requires about 30 seconds through 1 minute in a cold start state, in which no almanac data is held, to perform the reception of the ephemeris parameters and the positioning calculation to obtain the positioning data.

Therefore, the reception in the positioning mode means the process in which the number of captured satellites is at least three, the required reception time is about 30 seconds through 1 minute, the information to be obtained is the Z count data (the time information) and the ephemeris parameters, and the almanac parameters are not received. Therefore, in the positioning mode, the reception time of the satellite signal becomes longer than in the time measurement mode, and it is possible that the reception of the satellite signal with high reliability becomes difficult if the signal intensity becomes worse during the reception. Therefore, in the positioning mode, it is preferable to receive the satellite signal having the signal intensity higher in reliability.

Circuit Configuration of GPS Watch

Figure 3:
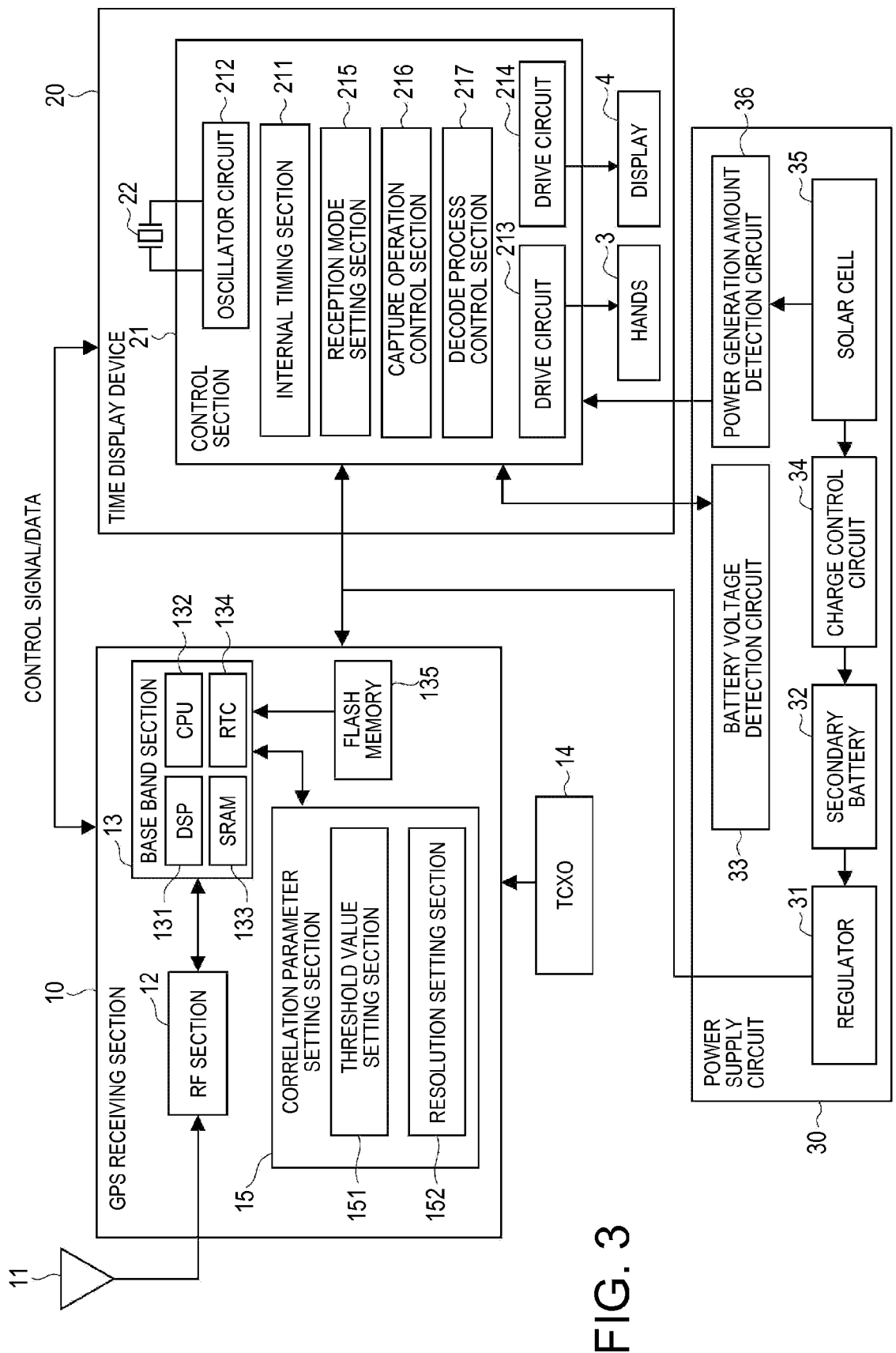
FIG. 3 is a diagram for explaining a circuit configuration of the watch with the GPS according to the embodiment.

FIG. 3 is a diagram for explaining a circuit configuration of the GPS watch 1 according to the first embodiment.

The GPS watch 1 is configured including a GPS receiving section 10 as a receiving section, a GPS antenna 11, a time display device 20, and a power supply circuit 30.

Configuration of GPS Receiving Section

To the GPS receiving section 10, there is connected the GPS antenna 11. The GPS antenna 11 is an antenna for receiving the satellite signals from a plurality of GPS satellites 5.

Further, the GPS receiving section 10 is configured including an RF (radio frequency; wireless frequency) section 12, a base band section 13, a correlation parameter setting section 15, and a flash memory 135.

The RF section 12 is a typical constituent in the GPS receiver, and is provided with a down converter for converting a high-frequency signal into a signal in an intermediate-frequency band, an A/D converter for converting the analog signal in the intermediate-frequency band into a digital signal, and so on. Therefore, in the RF section 12, the satellite signal received is converted into a digital signal, and is then output to the base band section 13.

The base band section 13 is configured including a digital signal processor (DSP) 131, a central processing unit (CPU) 132, a static random access memory (SRAM) 133, and a real time clock (RTC) 134. Further, to the GPS receiving section 10, there is connected a temperature-compensated crystal oscillator (TCXO) 14, and to the base band section 13, there are connected the flash memory 135 and so on.

The temperature-compensated crystal oscillator (TCXO) 14 generates a reference clock signal with a roughly constant frequency irrespective of the temperature.

The flash memory 135 stores the time difference information. The time difference information is the information in which the time differences between a plurality of regions with geographical information divided are defined.

The base band section 13 performs a process for decoding a base band signal from the digital signal (the signal in the intermediate-frequency band) converted by the RF section 12.

Further, in order to capture the satellite signal, the base band section 13 performs a process of generating a local code having the same pattern as each of the C/A codes, and then calculating the correlation between the C/A code included in the base band signal and the local code. Therefore, the base band section 13 also functions as a correlation section according to the invention.

Then, the base band section 13 adjusts the generation timing of the local code so that the correlation value with respect to each of the local codes reaches a peak, and then determines that the synchronization with the GPS satellite 5 with the local code has been established (i.e., the satellite signal from the GPS satellite 5 has been captured) in the case in which the correlation value has become equal to or higher than a predetermined correlation threshold value.

Here, in the GPS system, there is adopted a code division multiple access (CDMA) system in which all of the GPS satellites 5 transmit the satellite signals with the same frequency using the respective C/A codes different from each other. Therefore, by identifying the C/A code included in the satellite signal received, it is possible to search for the GPS satellites 5, which can be captured. Specifically, by performing the correlation process using the PRN codes respectively set to the GPS satellites 5, it is possible to search for the GPS satellite 5.

Further, in the present embodiment, a sliding correlation system is adopted as the correlation system, and is executed mainly in the DSP 131.

Correlation Parameter Setting Section

Further, the GPS receiving section 10 is provided with the correlation parameter setting section 15 for setting parameters of the correlation process in the base band section 13.

The correlation parameter setting section 15 includes a threshold value setting section 151 and a resolution setting section 152.

Threshold Value Setting Section

The threshold value setting section 151 sets a value of a signal reception threshold value Th. Specifically, the base band section 13 detects the signal intensity of the satellite signal received, and then performs a process of capturing the satellite signal in the case in which the signal intensity is equal to or higher than the signal reception threshold value set by the threshold value setting section 151.

The threshold value setting section 151 of the present embodiment changes the signal reception threshold value in four levels. For example, a first signal reception threshold value Th1 is set to "−133 dBm," a second signal reception threshold value Th2 is set to "−135 dBm," a third signal reception threshold value Th3 is set to "−140 dBm," and a fourth signal reception threshold value Th4 is set to "−148 dBm." Therefore, the first signal reception threshold value Th1 is the highest value (−133 dBm) of the assignable four levels of values, the second signal reception threshold value Th2 and the third signal reception threshold value Th3 are set to the values descending in this order, and the fourth signal reception threshold value Th4 is the lowest value (−148 dBm). These specific threshold values are stored in the flash memory 135. Therefore, the values of the first through fourth signal reception threshold values Th1 through Th4 are not limited to those described above, but can be set by changing the numerical values to be stored in the flash memory 135.

Further, the first signal reception threshold value Th1 is set to a value for capturing only the satellite signal with a high signal intensity, in other words, only the satellite signal from the GPS satellite 5 with a high elevation angle. In contrast, the fourth signal reception threshold value Th4 is set to a value with which the satellite signal with a low signal intensity, in other words, the satellite signal from the GPS satellite 5 with a low elevation angle, can also be captured. It should be noted that the fourth signal reception threshold value Th4 corresponds to the lowest signal intensity with which the information can be obtained from the satellite signal, and it becomes difficult to obtain correct information from the satellite signal with a signal intensity lower than the lower limit value due to a high proportion of the noise component.

The second signal reception threshold value Th2 and the third signal reception threshold value Th3 are set to values with which the satellite signal with an intermediate signal level, namely the satellite signal from the GPS satellite 5 with an intermediate elevation angle, can be captured.

As described later, the signal reception threshold values Th set by the threshold setting section 151 are changed in accordance with the change in the frequency resolution set by the resolution setting section 152.

Resolution Setting Section

The resolution setting section 152 sets a value of frequency resolution Δf. Specifically, the frequency of the satellite signal to be received by the GPS receiving section 10 changes due to a Doppler effect. Specifically, although the frequency of the satellite signal transmitted from the GPS satellite 5 located in the zenith direction of the GPS watch 1 is the same as the transmission frequency, the frequency of the satellite signal transmitted from the GPS satellite 5 approaching the GPS watch 1 becomes higher than the transmission frequency, and the frequency of the satellite signal transmitted from the GPS satellite 5 getting away from the GPS watch 1 becomes lower than the transmission frequency.

Therefore, in the base band section 13, the correlation process is performed while changing the frequency of the local code. The resolution setting section 152 changes a variation in the frequency, namely a frequency resolution, in a plurality of levels.

The resolution setting section 152 of the present embodiment changes the frequency resolution $\Delta f$ in four levels. For example, a first frequency resolution $\Delta f1$ is set to "150 Hz," a second frequency resolution $\Delta f2$ is set to "75 Hz," a third frequency resolution $\Delta f3$ is set to "10 Hz," and a fourth frequency resolution $\Delta f4$ is set to "2 Hz." Therefore, the first frequency resolution $\Delta f1$ is the largest value (150 Hz) of the assignable four levels of values, the second frequency resolution $\Delta f2$ and the third frequency resolution $\Delta f3$ are set to the values descending in this order, and the fourth frequency resolution $\Delta f4$ is the smallest value (2 Hz).

The correlation parameter setting section 15 switches the variation patterns of the signal reception threshold value Th and the frequency resolution $\Delta f$ in accordance with the reception mode.

Setting in Positioning Mode

Figure 4:
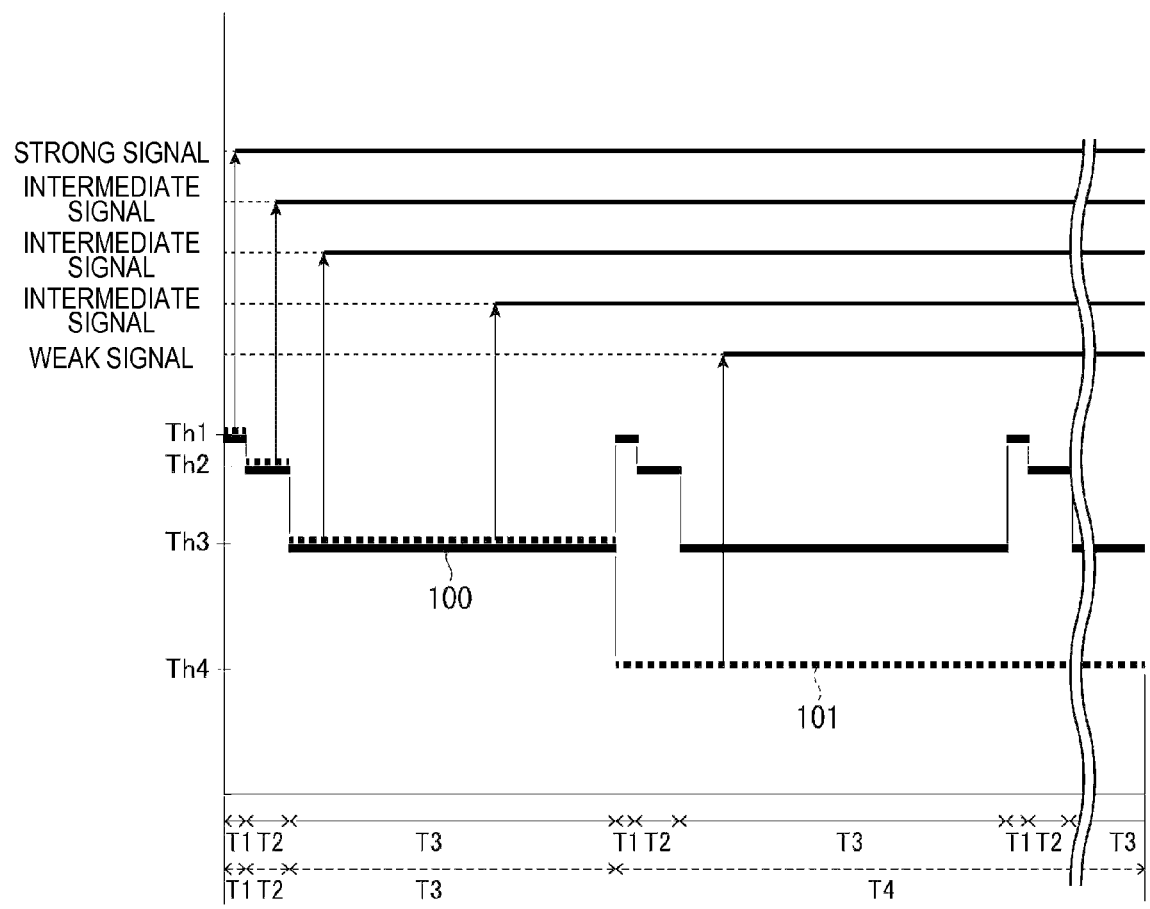
FIG. 4 is a timing chart showing a capture process of the satellite signal in the embodiment.

In the positioning mode, the correlation parameter setting section 15 changes the signal reception threshold value Th from the first signal reception threshold value Th1 to the fourth signal reception threshold value Th4 using the threshold value setting section 151, and changes the frequency resolution $\Delta f$ from the first frequency resolution $\Delta f1$ to the fourth frequency resolution $\Delta f4$ using the resolution setting section 152 as indicated by the dotted light 101 shown in FIG. 4 to perform the search process.

Therefore, in the capture process performed by the base band section 13 in the positioning mode, a first search process in which the first signal reception threshold value Th1 and the first frequency resolution $\Delta f1$ are set, a second search process in which the second signal reception threshold value Th2 and the second frequency resolution $\Delta f2$ are set, a third search process in which the third signal reception threshold value Th3 and the third frequency resolution $\Delta f3$ are set, and a fourth search process in which the fourth signal reception threshold value Th4 and the fourth frequency resolution $\Delta f4$ are set are repeatedly executed in this order. These first through fourth search processes are repeated until the reception termination condition of the satellite signal in the positioning mode is fulfilled.

In the case in which the reception termination condition of the satellite signal in the positioning mode is fulfilled, the GPS receiving section 10 terminates the receiving process of the satellite signal. Specifically, in the case in which the GPS receiving section 10 has captured three or more satellite signals, and then successfully decoded and then obtained the positional information and the time information, the GPS receiving section 10 terminates the receiving process of the satellite signal.

Further, in the case in which the GPS receiving section 10 has failed to obtain the positional information and the time information before a predetermined time elapses from the starting point of the receiving operation of the satellite signal, the GPS receiving section 10 determines that timeout has occurred, and then terminates the receiving process of the satellite signal.

Search Process in Time Measurement Mode

In the time measurement mode, the correlation parameter setting section 15 changes the signal reception threshold value Th from the first signal reception threshold value Th1 to the third signal reception threshold value Th3 using the threshold value setting section 151, and changes the frequency resolution $\Delta f$ from the first frequency resolution $\Delta f1$ to the third frequency resolution $\Delta f3$ using the resolution setting section 152 as indicated by the solid light 100 shown in FIG. 4 to perform the search process.

Therefore, in the capture process performed by the base band section 13 in the time measurement mode, the first search process, the second search process, and the third search process are repeatedly executed in this order. Therefore, the fourth search process is not executed in the time measurement mode. In other words, the correlation parameter setting section 15 sets the minimum value (the third frequency resolution $\Delta f3$) of the frequency resolution in the time measurement mode to a value larger than the minimum value (the fourth frequency resolution $\Delta f4$) of the frequency resolution in the positioning mode.

It should be noted that T1 through T3 indicated by the solid lines along the horizontal axis shown in FIG. 4 respectively represent processing time T1 through T3 of the first through third search processes in the time measurement mode. Further, T1 through T4 indicated by the dotted lines along the horizontal axis shown in FIG. 4 respectively represent processing time T1 through T4 of the first through fourth search processes in the positioning mode. Similarly, in also FIGS. 11 and 13 described later, the solid lines indicate the processing time in the time measurement mode, and the dotted lines indicate the processing time in the positioning mode.

In the case in which the reception termination condition of the satellite signal in the time measurement mode is fulfilled, the GPS receiving section 10 terminates the receiving process of the satellite signal. Specifically, in the case in which the GPS receiving section 10 has captured at least one satellite signal, and then successfully decoded and then obtained the time information, the GPS receiving section 10 terminates the receiving process of the satellite signal.

Further, in the case in which the GPS receiving section 10 has failed to obtain the time information before a predetermined time elapses from the starting point of the receiving operation of the satellite signal, the GPS receiving section 10 determines that timeout has occurred, and then terminates the receiving process of the satellite signal.

First Search Process

Here, the case of searching for 32 GPS satellites 5 will be explained. In order to capture receivable GPS satellites 5 among the 32 GPS satellites 5, the base band section 13 performs the PRN correlation process while switching the PRN code (the pseudo random noise code) from PRN1 to PRN32. Further, as described above, since there is a possibility that the frequency is varied due to the Doppler effect, the PRN correlation process with respect to PRN1 through PRN32 is performed while changing the frequency by the frequency resolution. The processing time of the PRN correlation process for each of the satellites depends on the operation clock and the number of correlators, but is, for example, 0.3 ms. In this case, it takes 0.3×32=9.6 ms to perform the PRN correlation process of the 32 satellites. Further, in the case of setting the Doppler frequency band to ±8 kHz, and setting the frequency resolution $\Delta f$ to the first frequency resolution $\Delta f1$ (=150 Hz), it results that the PRN correlation process is repeated ±8 kHz/150 Hz≈106 times. Therefore, the processing time T1 necessary to perform the search for all of the GPS satellites 5 with the first search process is 9.6 ms×106≈1 sec.

Further, in the first search process, if the satellite signal having the reception signal intensity equal to or higher than the first signal reception threshold value Th1 has been found out, the capture of the satellite signal is complete, and then the decode process of the positional information and the time information is subsequently performed.

Second Search Process

In the second search process, the process is performed with the second frequency resolution Δf2 (=75 Hz), and therefore, it is possible to search for all of the GPS satellites 5 in the processing time T2≈2 seconds.

Further, in the second search process, if the satellite signal having the reception signal intensity equal to or higher than the second signal reception threshold value Th2 has been found out, the capture of the satellite signal is complete, and then the decode process of the positional information and the time information is subsequently performed.

Third Search Process

In the third search process, the process is performed with the third frequency resolution Δf2 (=10 Hz), and therefore, it is possible to search for all of the GPS satellites 5 in the processing time T3≈15 seconds.

Further, in the third search process, if the satellite signal having the reception signal intensity equal to or higher than the third signal reception threshold value Th3 has been found out, the capture of the satellite signal is complete, and then the decode process of the positional information and the time information is subsequently performed.

Fourth Search Process

In the fourth search process, the process is performed with the fourth frequency resolution Δf4 (=2 Hz), and therefore, it is possible to search for all of the GPS satellites 5 in the processing time T4≈80 seconds.

Further, in the fourth search process, if the satellite signal having the reception signal intensity equal to or higher than the fourth signal reception threshold value Th4 has been found out, the capture of the satellite signal is complete, and then the decode process of the positional information and the time information is subsequently performed.

It should be noted that if the search process is performed four times from the first search process to the fourth search process, the processing time becomes T1+T2+T3+T4≈97 seconds. In contrast, the processing time necessary for the first through third search processes is T1+T2+T3≈18 seconds. Therefore, even in the case in which the search process is performed 15 times by repeating the first through third search processes five times, the processing time is about 90 seconds (about 18 seconds×5 times), and the search process can be performed a larger number of times.

It should be noted that the reason that the frequency resolution Δf can be set to a large value in the case in which the signal reception threshold Th is high is that in the case in which the reception signal intensity is high, the signal can be detected using the PRN correlation, and thus, the satellite signal can be captured even if some difference exists between the frequency (specifically an intermediate frequency) of the received signal and the frequency of the local code.

In contrast, in the case in which the reception signal intensity is low, since the allowable value of the error in the frequency is small, it is desirable to set the frequency resolution Δf to a small value (a fine value).

When the satellite signal has been captured in each of the search processes, the base band section 13 mixes the local code having the same pattern as the C/A code of the GPS satellite 5 thus captured and the base band signal with each other, and then decodes the navigation message to obtain the satellite information such as the orbit information and the GPS time information included in the navigation message, and then stores the satellite information in the SRAM 133.

The orbit information and the GPS time information included in the navigation message are an example of the positional information and the time information in the invention, and the GPS receiving section 10 functions as a receiving section in the invention. Further, the base band section 13 of the GPS receiving section 10 functions as an information acquisition section for obtaining the positional information and the time information.

It should be noted that the operation of the base band section 13 is sync with the reference clock signal output from the temperature-compensated crystal oscillator (TCXO) 14. The RTC 134 is for generating the timing for processing the satellite signal. The RTC 134 is incremented in response to the reference clock signal output from the temperature-compensated crystal oscillator (TCXO) 14.

Configuration of Time Display Device

As shown in FIG. 3, the time display device 20 is configured including a control section 21 and a crystal vibrator 22.

The control section 21 is provided with an internal timing section 211, an oscillator circuit 212, drive circuits 213, 214, a reception mode setting section 215, a capture operation control section 216, and a decode process control section 217, and performs a variety of types of control.

The internal timing section 211 counts the internal time information, and stores the result. The internal time information is the information of the time measured inside the GPS watch 1. The internal timing section 211 updates the internal time information in response to the reference clock signal generated by the crystal vibrator 22 and the oscillator circuit 212. Therefore, the internal timing section 211 is arranged to be able to update the internal time information to continue the handling of the hands 3 even in the case in which the power supply to the GPS receiving section 10 is stopped.

The drive circuit 213 controls the operation of the hands 3. The drive circuit 214 controls the display of the display 4.

As described above, the reception mode setting section 215 sets the reception mode to either one of the positioning mode and the time measurement mode in response to the operation of the buttons 6 or the like by the user, and sets the reception mode to an automatic time measurement mode in which the reception in the time measurement mode is performed in the case in which an automatic reception condition set in advance is fulfilled if no setting input from the buttons 6 or the like occurs.

Further, if the receiving process is selected by the operation of the buttons 6 in the state in which the reception mode is set to the positioning mode, the GPS watch 1 obtains the Z count data and the ephemeris parameters from at least three satellite signals as described above, and then performs a positioning calculation process for calculating the current location at which the GPS watch 1 is located.

Further, in the time measurement mode, the GPS watch 1 obtains only the Z count data from at least one satellite signal as described above, and then performs a time correction process based on the Z count data thus obtained. The operation of the time measurement mode can also be performed by a manual operation of the user, but is automatically performed in the case in which the automatic reception condition is fulfilled.

The capture operation control section 216 and the decode process control section 217 controls the GPS receiving section 10 to perform the receiving process. In other words, the capture operation control section 216 transmits a control signal to the GPS receiving section 10 to control the receiving operation of the GPS receiving section 10, in particular the operation of capturing the satellite signal.

The decode process control section 217 also controls the receiving operation of the GPS receiving section 10, in particular the decode process in the base band section 13.

Further, in the case in which the reception mode is set to the time measurement mode or the automatic time measurement mode, the capture operation control section 216 and the decode process control section 217 control the operation of the GPS receiving section 10 to obtain the GPS time information including the Z count data from the satellite signal, and then correct the internal time information based on the GPS time information to update the internal time information counted by the internal timing section 211.

On this occasion, the capture operation control section 216 and the decode process control section 217 calculate the time difference between the GPS time based on the Z count data of the GPS time information thus obtained and the internal time counted by the internal timing section 211, and then correct the internal time information of the internal timing section 211 if the time difference is within a predetermined value. It should be noted that the predetermined value is arbitrarily set in accordance with the elapsed time from the time point when the time measurement mode has been successful last time to the present.

Specifically, in the case in which the internal time information is updated in accordance with the reference clock signal generated by the crystal vibrator 22 and the oscillator circuit 212, an error of ±0.5 second per day is generated. Therefore, there is a case in which the time error of "0.5 s×(number of days elapsed)" at the longest occurs in the internal time in a period from the previous time correction to the present time correction in the time measurement mode. Further, in the case in which the satellite signal is contaminated with noise or the like and correct GPS time information fails to be obtained, the time difference between the internal time and the GPS time takes a value larger than the time error in the internal clock.

Therefore, by setting "0.5 s×(number of days elapsed)" as the predetermined value, it is possible to determine whether the time difference between the internal time of the internal timing section 211 and the GPS time derives from the error in the internal time or derives from the GPS time information of an inappropriate satellite signal. Further, in the case in which the time difference between the internal time and the GPS time is within the predetermined value, the capture operation control section 216 and the decode process control section 217 determine that the time difference derives from the internal time error, and then update the internal time information of the internal timing section 211.

Further, in the case of the positioning mode, the capture operation control section 216 and the decode process control section 217 control the operation of the GPS receiving section 10 to correct the internal time information based on the GPS time information and the UTC parameter, and the time difference data obtained from the flash memory 135 based on the positional information, and then store the internal time information in the internal timing section 211.

Then, after the internal time information has been corrected, the control section 21 corrects the indication of the hands 3 via the drive circuit 213. Further, the control section 21 arbitrarily displays the time, the positional information, and so on on the display 4 via the drive circuit 214.

Configuration of Power Supply Circuit

The power supply circuit 30 is provided with a regulator 31, a secondary battery 32, a battery voltage detection circuit 33, a charge control circuit 34, a solar cell 35, and a power generation amount detection circuit 36 constituting a power generation amount detector.

The secondary battery 32 supplies the GPS receiving section 10, the time display device 20, and so on with drive power via the regulator 31.

The battery voltage detection circuit 33 is operated by a control signal from the control section 21, and monitors the voltage of the secondary battery 32.

The charge control circuit 34 is disposed between the solar cell 35 and the secondary battery 32, and controls charging of the secondary battery 32 with a current supplied from the solar cell 35.

As described above, the power generation amount detection circuit 36 detects the amount of power generated by the solar cell 35, and then outputs a power generation detection signal corresponding to the power generation amount to the control section 21 of the time display device 20.

As described later, the control section 21 automatically performs the receiving process in the time measurement mode in the case in which it is detected that power generation amount of the solar cell 35 becomes equal to or higher than a predetermined amount.

Receiving Process

Figure 5:
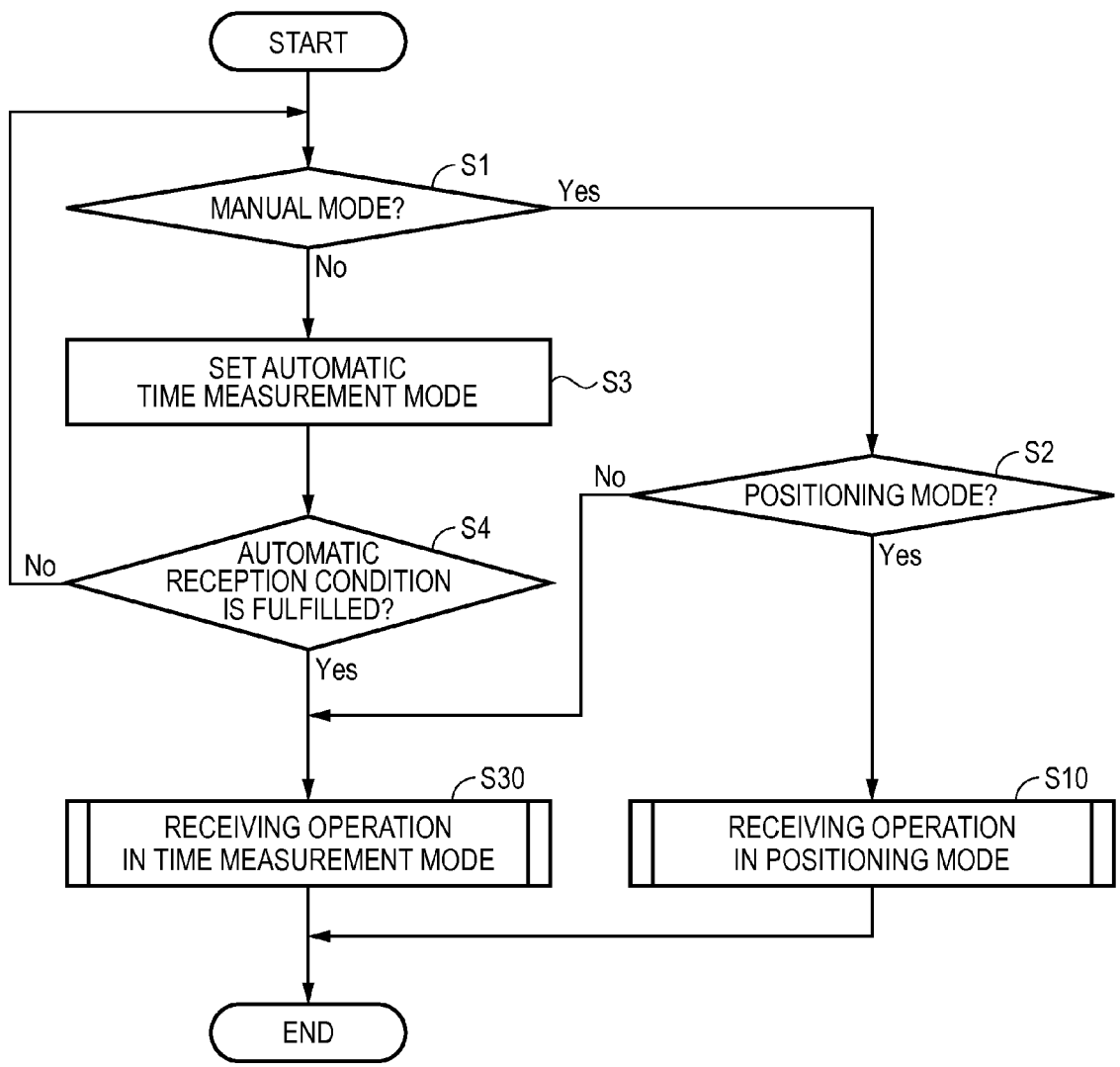
FIG. 5 is a flowchart showing a receiving process of the satellite signal in the embodiment.

Hereinafter, a procedure of the receiving process in the GPS watch 1 according to the first embodiment will be explained with reference to the flowchart shown in FIG. 5.

Firstly, the GPS watch 1 determines (step S1) whether or not the setting information for setting either one of the time measurement mode and the positioning mode is input using the operation of the buttons 6 or the like by the user, namely whether or not the manual mode is selected.

In the step S1, when the control section 21 of the time display device 20 recognizes the input of the setting information to determine that the manual mode is selected, the control section 21 further determines (step S2) whether or not the setting information is the information for switching the reception mode to the positioning mode.

Then, in the case in which the control section 21 determines in the step S2 that the setting information for switching the reception mode to the positioning mode has been input, namely "Yes," the capture operation control section 216 and the decode process control section 217 in the control section 21 output the control signal to the GPS receiving section 10 to make the GPS receiving section 10 perform (step S10) the receiving process of the satellite signal corresponding to the positioning mode.

Further, in the case in which the control section 21 determines in the step S2 that the setting information for switching the reception mode to the time measurement mode has been input, namely "No," the capture operation control section 216 and the decode process control section 217 in the control section 21 output the control signal to the GPS receiving section 10 to make the GPS receiving section 10 perform (step S30) the receiving process of the satellite signal corresponding to the time measurement mode.

Meanwhile, in the case in which the control section 21 determines in the step S21 that no setting information has been input, namely "No," the reception mode setting section 215 sets (step S3) the reception mode to the automatic time measurement mode.

In the automatic time measurement mode, the control section 21 determines (step S4) whether or not the automatic reception condition is fulfilled. As the automatic reception condition of the present embodiment, a regular reception condition and a light detection condition are set.

As the regular reception condition, there is set the time for starting the automatic reception, and the control section 21 refers to the internal time information of the internal timing section 211, and in the case in which predetermined appointed time, for example, 7:00 is counted, the control section 21 determines that the regular reception condition has been fulfilled, and then performs the automatic reception process.

Further, as the light detection condition, there is set a condition that the power generation amount detected by the power generation amount detection circuit 36 is equal to or higher than a predetermined threshold value. The threshold value is set to a value with which the light intensity obtained in the case in which the solar cell 35 is exposed to direct sunlight outdoors and the light intensity obtained in the case in which the solar cell 35 is exposed to the light of illumination or the like indoors can be discriminated from each other, and thus, it is possible to determine whether or not the GPS watch 1 is disposed outdoors. Further, by adopting the condition that the power generation amount detected by the power generation amount detection circuit 36 is equal to or higher than the threshold value as the automatic reception condition, it is possible to perform the automatic reception process in an environment in which the satellite signal is easily received such as the case in which the GPS watch 1 is disposed outdoors.

Therefore, in the step S4, the determination of "Yes" is made in the case in which the internal time information reaches the appointed time thus set, or the case in which the power generation amount detected by the power generation amount detection circuit 36 becomes equal to or higher than the threshold value. It should be noted that in order to prevent the power consumption from increasing, the automatic reception process is limited to once a day. Therefore, in the case in which the determination of "Yes" is made in either one of the regular reception condition and the light detection condition, the control section 21 makes the determination of "No" until the next day.

In the case in which the determination of "Yes" is made in the step S4, the capture operation control section 216 and the decode process control section 217 of the control section 21 output the control signal to the GPS receiving section 10 to make the GPS receiving section 10 perform the receiving process of the satellite signal corresponding to the time measurement mode in the step S30. Further, in the case of making the determination of "No" in the step S4, an input wait state for the setting information from the user occurs, and the process returns to the step S1.

Receiving Process in Positioning Mode

Figure 6:
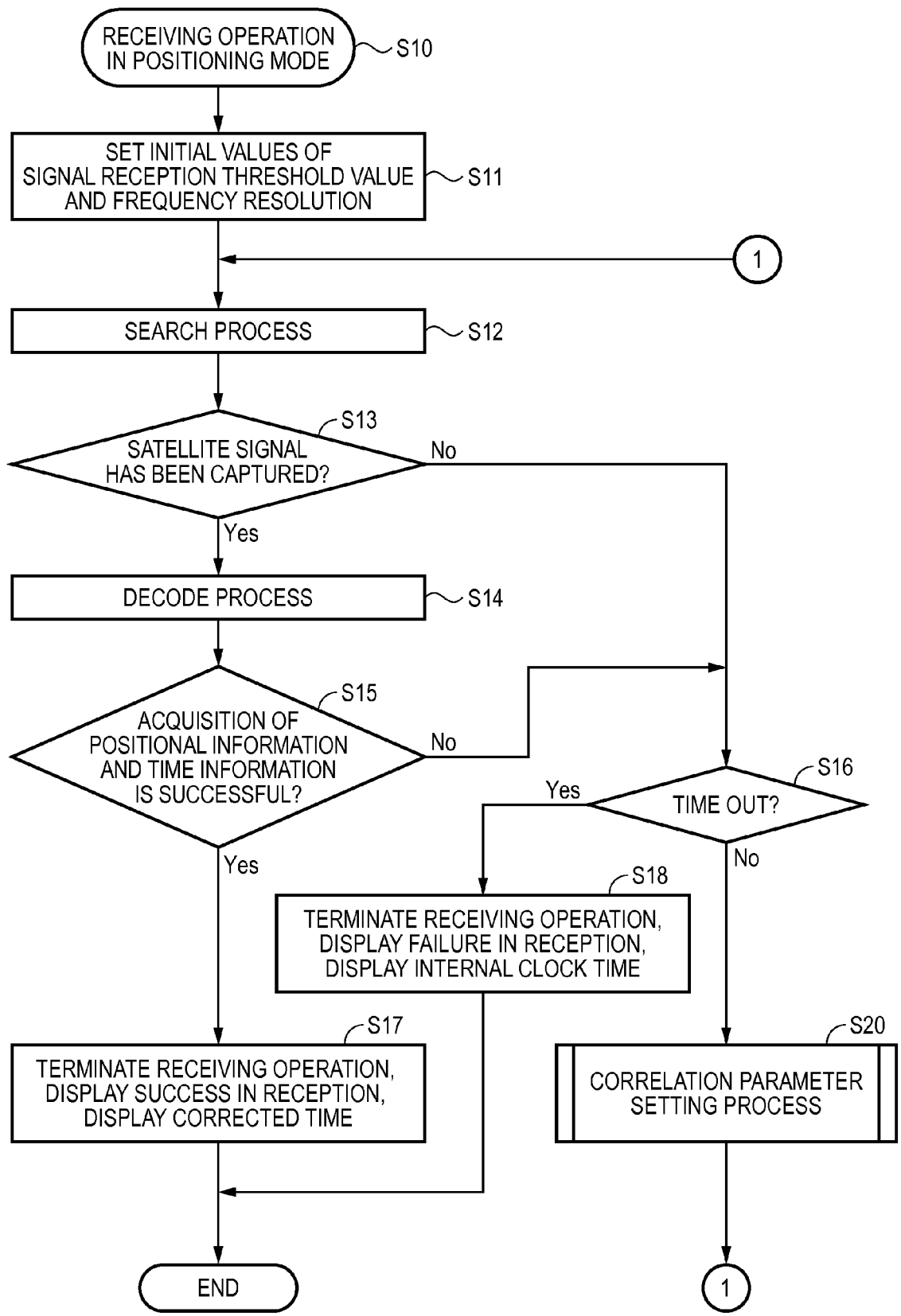
FIG. 6 is a flowchart showing a receiving operation in a positioning mode in the receiving process of the satellite signal in the embodiment.

Then, the receiving process in the positioning mode in the step S10 will be explained with reference to the flowchart shown in FIG. 6.

In the receiving process in the positioning mode, the correlation parameter setting section 15 sets the signal reception threshold value to an initial value (the first signal reception threshold value Th1 in the present embodiment) using the threshold value setting section 151, and sets (step S11) the frequency resolution to an initial value (the first frequency resolution $\Delta f1$ in the present embodiment) using the resolution setting section 152.

Subsequently, the base band section 13 performs (step S12) the satellite capture operation (the search process) for searching for the satellite signal transmitted from the GPS satellite 5 to capture the satellite signal. It should be noted that since the correlation parameters are set to the first signal reception threshold value Th1 and the first frequency resolution $\Delta f1$, the first search process described above is performed.

The base band section 13 detects the signal intensity (SNR) of the satellite signal captured in the first search process, and then determines whether or not the signal intensity thus detected is equal to or higher than the first signal reception threshold value Th1 to thereby determine (step S13) whether or not the satellite signal has been captured. Therefore, in the case in which the signal intensity is equal to or higher than the first signal reception threshold value Th1, the base band section 13 determines (Yes in the step S13) that the satellite signal has been captured.

In the case in which the determination of "Yes" is made in the step S13, the base band section 13 performs (step S14) the decode process of the satellite signal thus captured.

Then, the base band section 13 determines (step S15) whether or not the acquisition of the positional information and the time information is successful.

In the case in which the satellite signal has failed to be captured in the first search process (No in the step S13) and the case in which, for example, capturing of three or more satellite signals has not been achieved, and the acquisition of the positional information and the time information is unsuccessful (No in the step S15), the base band section 13 determines (step S16) whether or not the receiving process has timed out.

In the case in which the determination of "No" has been made in the step S16, the correlation parameter setting section 15 performs (step S20) the correlation parameter setting process.

Correlation Parameter Setting Process

Figure 7:
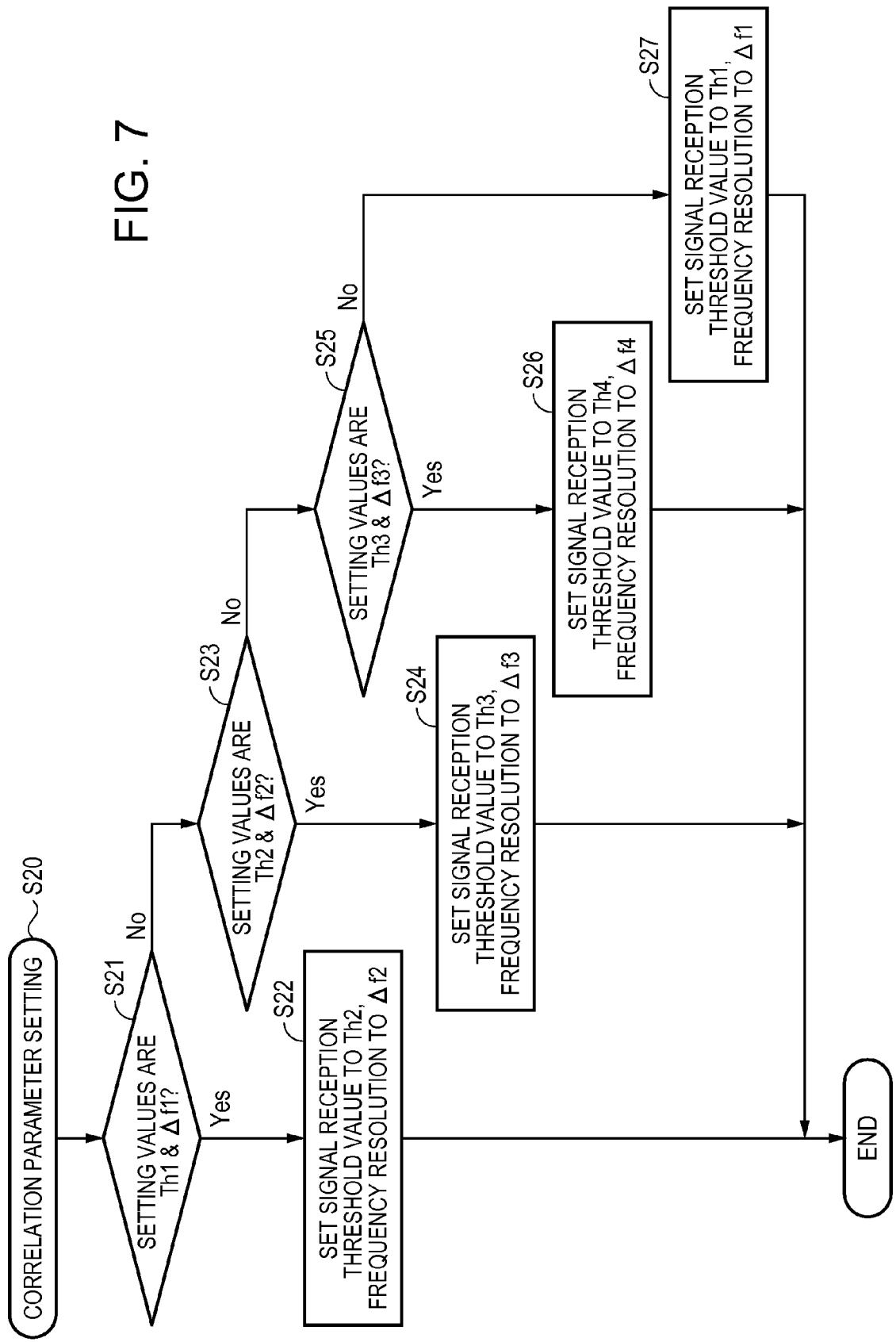
FIG. 7 is a flowchart showing a correlation parameter setting process in the receiving operation in the positioning mode in the embodiment.

Then, the correlation parameter setting process S20 by the correlation parameter setting section 15 will be explained based on FIG. 7.

The correlation parameter setting section 15 determines (step S21) whether or not the current setting values are the first signal reception threshold value Th1 and the first frequency resolution $\Delta f1$. In the case in which the determination of "Yes" has been made in the step S21, the threshold value setting section 151 and the resolution setting section 152 of the correlation parameter setting section 15 change (step S22) the setting values to the second signal reception threshold value Th2 and the second frequency resolution $\Delta f2$. Therefore, as the subsequent search process S12, the second search process will be performed.

In the case in which the determination of "No" has been made in the step S21, the correlation parameter setting section 15 determines (step S23) whether or not the current setting values are the second signal reception threshold value Th2 and the second frequency resolution $\Delta f2$. In the case in which the determination of "Yes" has been made in the step S23, the threshold value setting section 151 and the resolution setting section 152 of the correlation parameter setting section 15 change (step S24) the setting values to the third signal reception threshold value Th3 and the third frequency resolution $\Delta f3$. Therefore, as the subsequent search process S12, the third search process will be performed.

In the case in which the determination of "No" has been made in the step S23, the correlation parameter setting section 15 determines (step S25) whether or not the current setting values are the third signal reception threshold value Th3 and the third frequency resolution $\Delta f3$. In the case in which the determination of "Yes" has been made in the step S25, the threshold value setting section 151 and the resolution setting section 152 of the correlation parameter setting section 15 change (step S26) the setting values to the fourth signal reception threshold value Th4 and the fourth frequency resolution $\Delta f4$. Therefore, as the subsequent search process S12, the fourth search process will be performed.

In the case in which the correlation parameter setting section 15 has made the determination of "No" in the step S25, since it results that the current setting values are the fourth signal reception threshold value Th4 and the fourth frequency resolution $\Delta f4$, the threshold setting section 151 and the resolution setting section 152 of the correlation parameter setting section 15 change (step S27) the setting values to the first signal reception threshold value Th1 and the first frequency resolution Δf1 as the initial values. Therefore, as the subsequent search process S12, the first search process will be performed again.

When the correlation parameter setting process S20 is completed in such a manner as described above, the base band section 13 performs the search process S12 with the parameters thus set, and repeats the process of the steps S13 through S16 described above.

Therefore, the first search process through the fourth search process are repeatedly performed until the reception termination condition of the satellite signal is fulfilled by the determination of "Yes" made in the step S15 or the determination of "Yes" made in the step S16.

When the control section 21 captures three or more satellite signals, then decodes them to successfully obtain the positional information and the time information, and then makes the determination of "Yes" in the step S15, the control section 21 performs (step S17) the process to be performed when the reception is successful. Specifically, the control section 21 terminates the receiving operation by the GPS receiving section 10, then make the display 4 display the information representing that the reception is successful, and at the same time, corrects the internal time information based on the GPS time information and the UTC parameter, and the time difference data obtained from the flash memory 135 based on the positional information, and then updates the internal timing section 211. Then, after the internal time information has been updated, the control section 21 corrects the indication of the hands 3 via the drive circuit 213. Further, the control section 21 arbitrarily displays the time, the positional information, and so on on the display 4 via the drive circuit 214.

When the determination of "Yes" has been made in the step S16, the control section 21 terminates the receiving operation of the satellite signal by the GPS receiving section 10. On this occasion, the time display device 20 performs (step S18) the process for making, for example, the display 4 display the information representing that the reception has failed, and making the hands 3 display the internal time counted by the internal timing section 211.

Receiving Process in Time Measurement Mode

Figure 8:
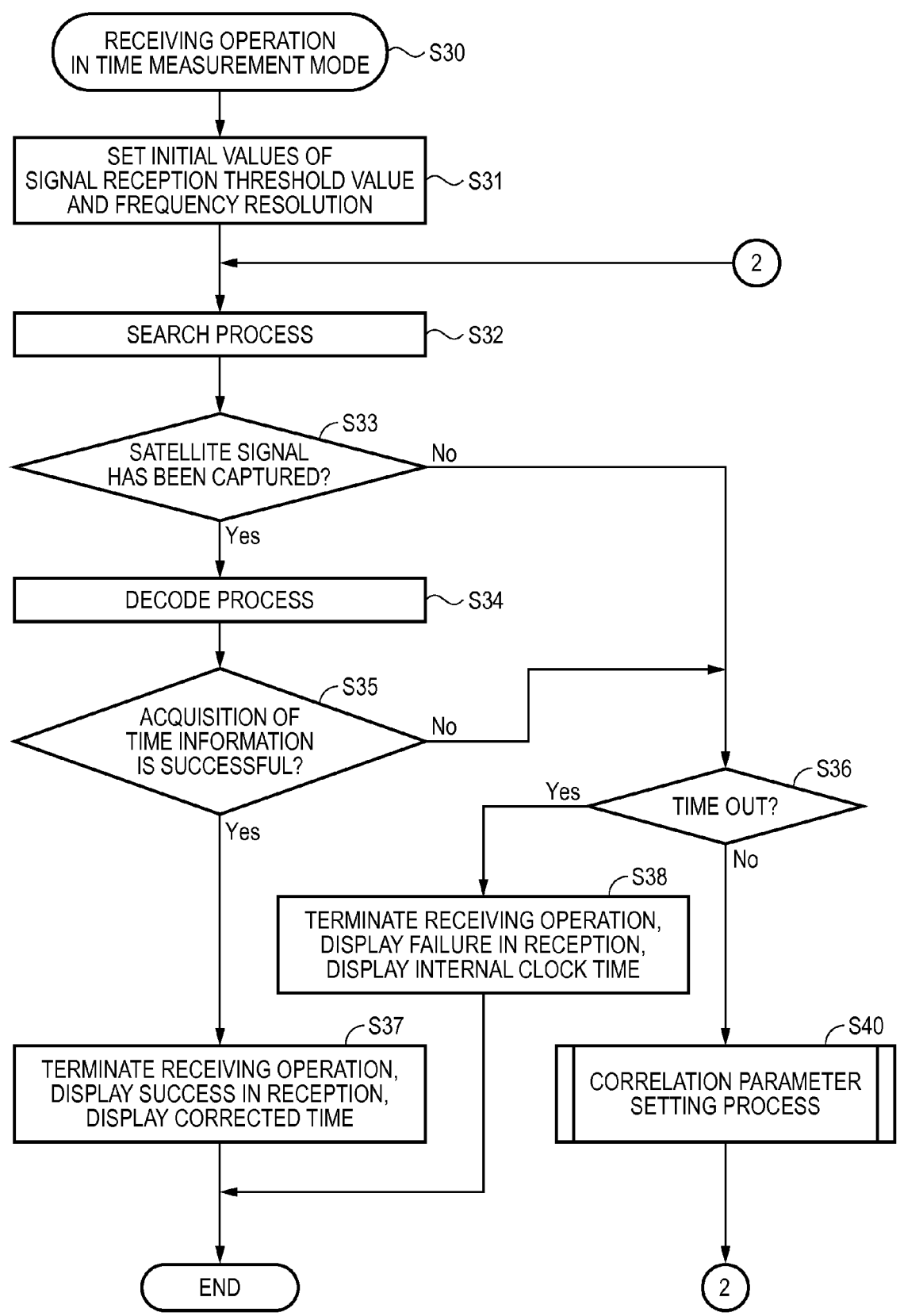
FIG. 8 is a flowchart showing a receiving operation in a time measurement mode in the receiving process of the satellite signal in the embodiment.

Then, the receiving process in the time measurement mode in the step S30 will be explained with reference to the flowchart shown in FIG. 8.

In the receiving process S31 through S38 in the time measurement mode in the step S30, the same process as the receiving process S11 through S18 in the positioning mode is performed except the point that whether or not the acquisition of the time information has been successful is only determined in the step S35 since the acquisition of the positional information is unnecessary. Therefore, the explanations thereof will be omitted.

Figure 9:
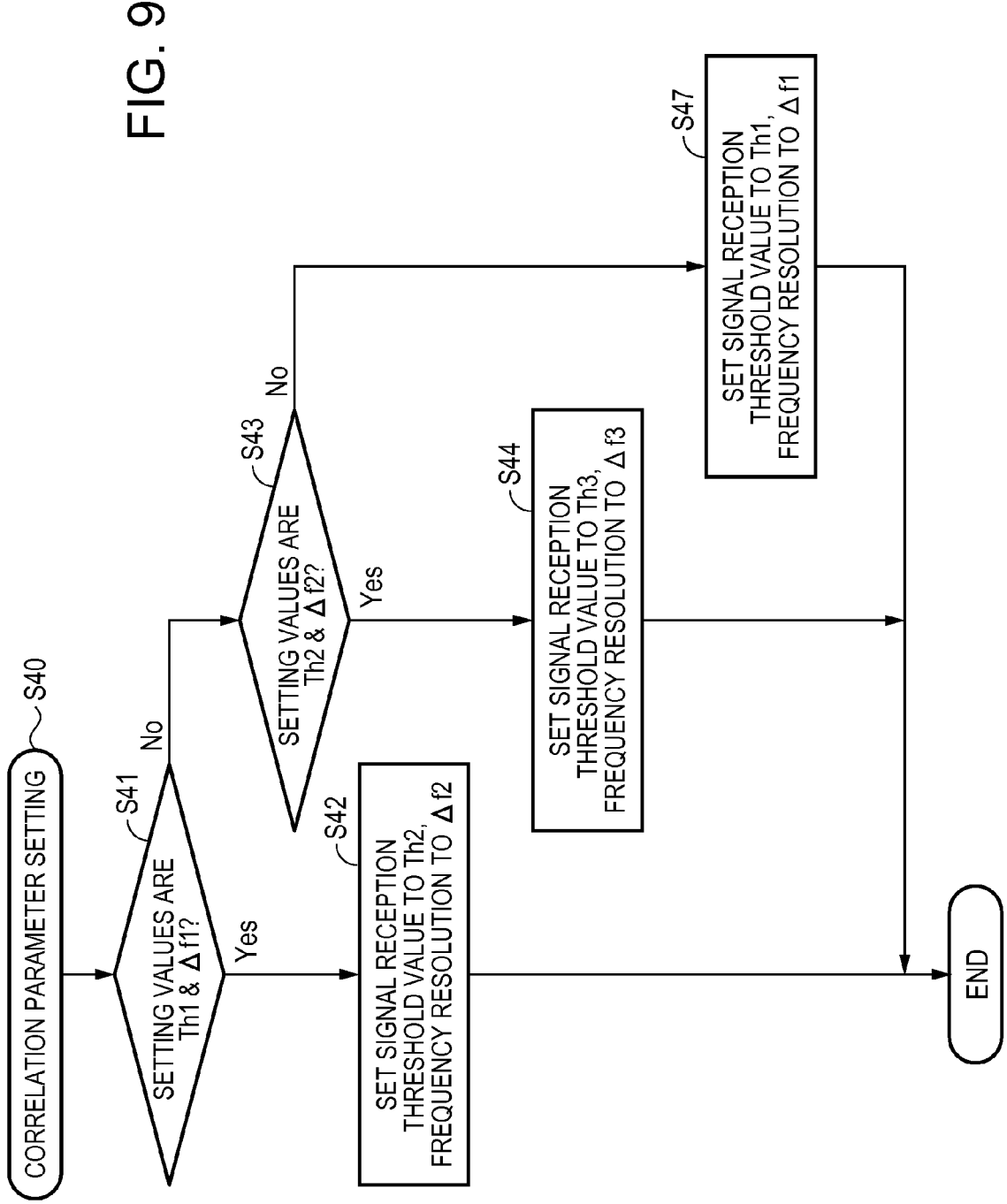
FIG. 9 is a flowchart showing a correlation parameter setting process in the receiving operation in the time measurement mode in the embodiment.

Further, as shown in FIG. 9, the correlation parameter setting process in the step S40 is the same as the correlation parameter setting process S20 in the positioning mode except the point that the process of setting the setting values to the fourth signal reception threshold value Th4 and the fourth frequency resolution Δf4 is eliminated.

Specifically, in the correlation parameter setting process S40 in the time measurement mode, in the case in which the determination of "Yes" has been made in the step S41, the setting values are set (step S42) to the second signal reception threshold value Th2 and the second frequency resolution Δf2, in the case in which the determination of "Yes" has been made in the step S43, the setting values are set (step S44) to the third signal reception threshold value Th3 and the third frequency resolution Δf3, and in the case in which the determination of "No" has been made in the step S43, the setting values are set (step S47) to the first signal reception threshold value Th1 and the first frequency resolution Δf1.

Therefore, in the time measurement mode, the first search process, the second search process, and the third search process are repeatedly performed until the reception termination condition of the satellite signal is fulfilled.

Functions and Advantages of First Embodiment

According to the present embodiment, since in the time measurement mode, the first through third search processes are performed, but the fourth search process is not performed, the number of times of the search per unit time can be increased compared to the case of performing all of the first through fourth search processes are performed. Therefore, the average time until the satellite signal is captured can be shortened, and the acquisition probability of the time information can be raised. Therefore, the receiving time in the time measurement mode can be shortened to reduce the power consumption, and thus the operating time of the GPS watch 1 can be elongated.

Further, since the correlation parameter setting section 15 uses the same setting values in the first through third search processes between the positioning mode and the time measurement mode, the system can be made simple compared to the case of using different setting values between the positioning mode and the time measurement mode.

Further, since all of the first through fourth search processes are performed in the positioning mode, the probability of capturing even the satellite signal low in signal intensity is increased. Therefore, the possibility of capturing the necessary number of satellite signals for the positioning process is also increased. Therefore, the acquisition probability of the positional information can also be raised.

Second Embodiment

Figure 10:
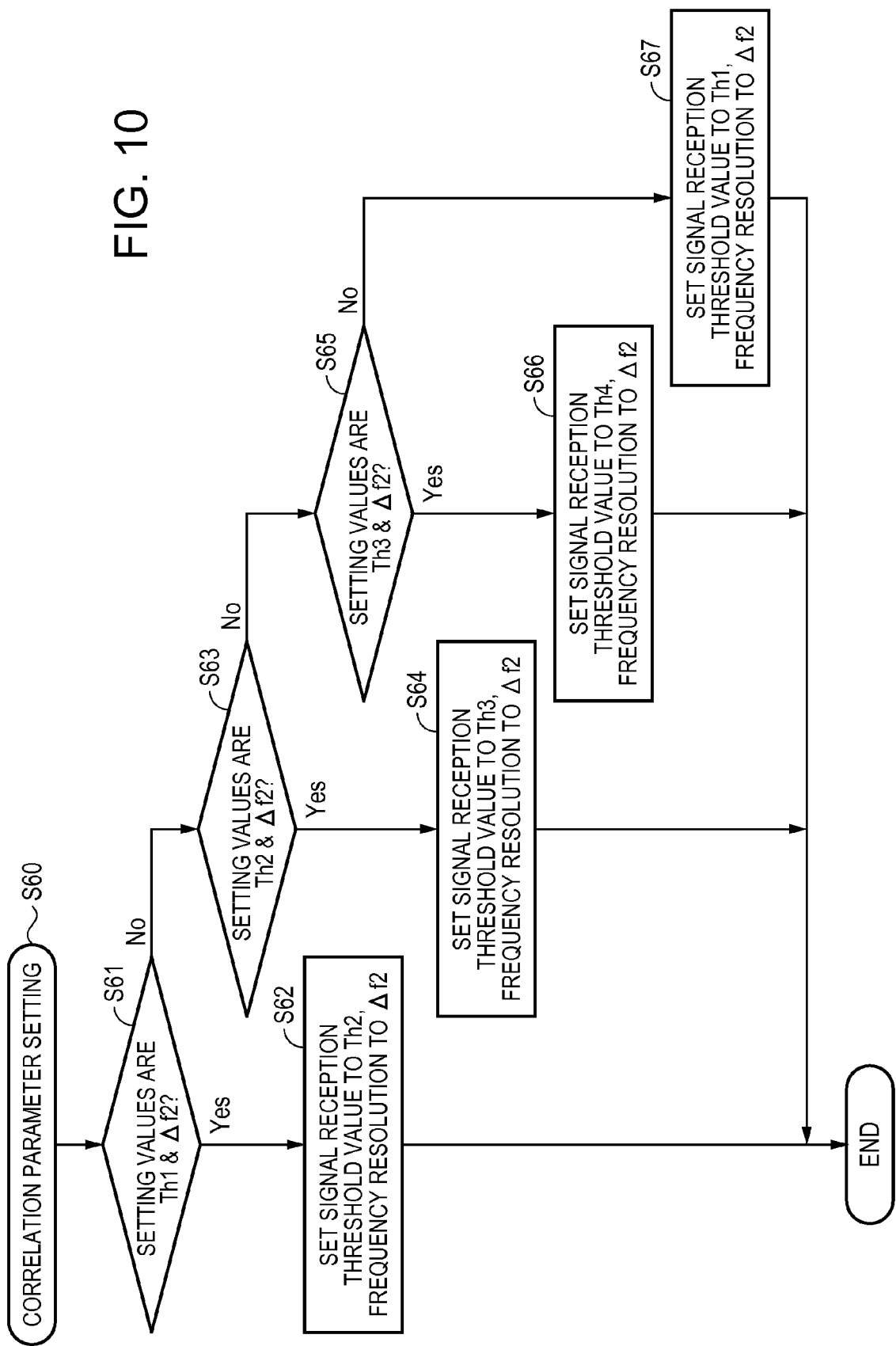
FIG. 10 is a flowchart showing a correlation parameter setting process in the receiving operation in the time measurement mode in a second embodiment of the invention.

Then, a second embodiment of the invention will be explained with reference to FIGS. 10 and 11. FIG. 10 shows a correlation parameter setting process S60 in the time measurement mode according to the second embodiment. It should be noted that in the second embodiment, since the process in the positioning mode is the same as in the first embodiment, the explanation thereof will be omitted.

The time measurement mode according to the second embodiment is different in the point that the signal reception threshold value Th is changed in four levels from the first signal reception threshold value Th1 through the fourth signal reception threshold value Th4, and the point that the frequency resolution Δf is set to a stationary value (e.g., the second frequency resolution Δf2).

Specifically, the correlation parameter setting section 15 sets the initial values of the correlation parameters in the time measurement mode to the first signal reception threshold value Th1 and the second frequency resolution Δf2. Then, in the correlation parameter setting process S60, if the setting values are the first signal reception threshold value Th1 and the second frequency resolution Δf2 (Yes in the step S61), the setting values are changed (step S62) to the second signal reception threshold value Th2 and the second frequency resolution Δf2.

Further, if the setting values are the second signal reception threshold value Th2 and the second frequency resolution Δf2 (Yes in the step S63), the setting values are changed (step S64) to the third signal reception threshold value Th3 and the second frequency resolution Δf2.

Further, if the setting values are the third signal reception threshold value Th3 and the second frequency resolution Δf2 (Yes in the step S65), the setting values are changed (step S66) to the fourth signal reception threshold value Th4 and the second frequency resolution Δf2. Further, if the determination of "No" has been made in the step S65, the setting values are changed (step S67) to the initial values, namely the first signal reception threshold value Th1 and the second frequency resolution Δf2.

Figure 11:
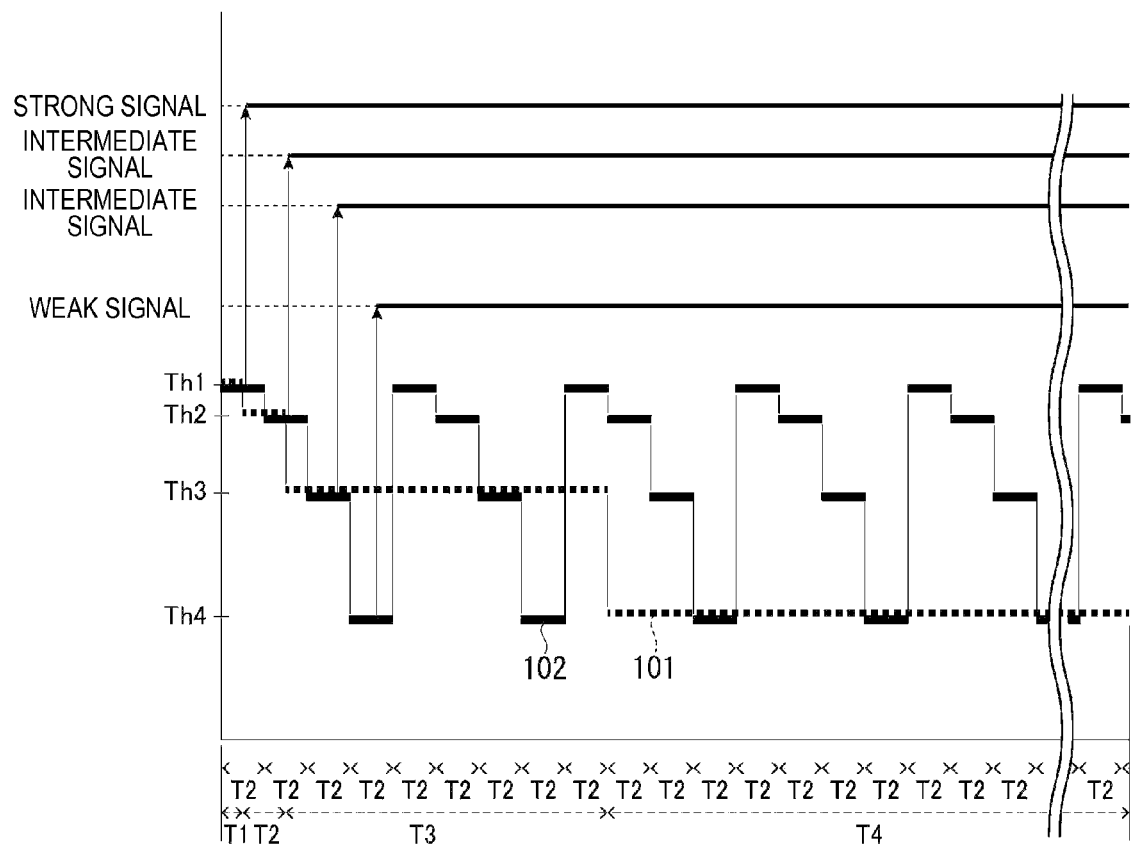
FIG. 11 is a timing chart showing a capture process of the satellite signal according to the second embodiment.

FIG. 11 shows the state of the search process in the second embodiment described above. As indicated by the solid line 102 shown in FIG. 11, in the time measurement mode according to the second embodiment, although the signal reception threshold value Th is sequentially changed to the four levels, the frequency resolution Δf is fixed to the second frequency resolution Δf2. Therefore, the second frequency resolution Δf2 (=75 Hz) in the time measurement mode is set to a value larger than the minimum value of the frequency resolution settable in the positioning mode, namely the fourth frequency resolution Δf4 (=2 Hz).

According to the second embodiment described above, in the time measurement mode, the cycle of the search process is short, and therefore, the number of times of the search process of the satellite in a given period of time can be increased compared to the positioning mode. Therefore, since the search process of all of the GPS satellites 5 can be performed every two seconds in the case in which the receiving process in the time measurement mode is performed, in the case in which the location has changed since the reception is performed while walking, the probability of capturing the GPS satellites 5 can be increased, and the acquisition probability of the time information can also be increased. Further, since the frequency resolution Δf is fixed to the second frequency resolution Δf2, the average time taken to obtain the time information can be shortened compared to the first embodiment in which the search process is performed while changing the frequency resolution Δf up to the third frequency resolution Δf3.

Therefore, the receiving time in the time measurement mode can be shortened to reduce the power consumption, and thus the operating time of the GPS watch 1 driven by the secondary battery 32 can also be further elongated.

Further, in the time measurement mode according to the second embodiment, the signal reception threshold value Th is changed in the four levels. On this occasion, although the second frequency resolution Δf2 is a large value, and therefore, the probability of capturing decreases compared to the case of performing the search process with the fourth frequency resolution Δf4, it is possible to increase the possibility of capturing the GPS satellite 5 weak in signal intensity compared to the time measurement mode in the first embodiment.

It should be noted that although in the second embodiment, the frequency resolution Δf in the time measurement mode is fixed to the second frequency resolution Δf2, it is also possible to fix the frequency resolution Δf in the time measurement mode to the first frequency resolution Δf1 or the third frequency resolution Δf3. In other words, it is sufficient to fix the frequency resolution Δf to a value larger than the minimum value of the frequency resolution settable in the positioning mode, namely the fourth frequency resolution Δf4 (=2 Hz).

Third Embodiment

Figure 12:
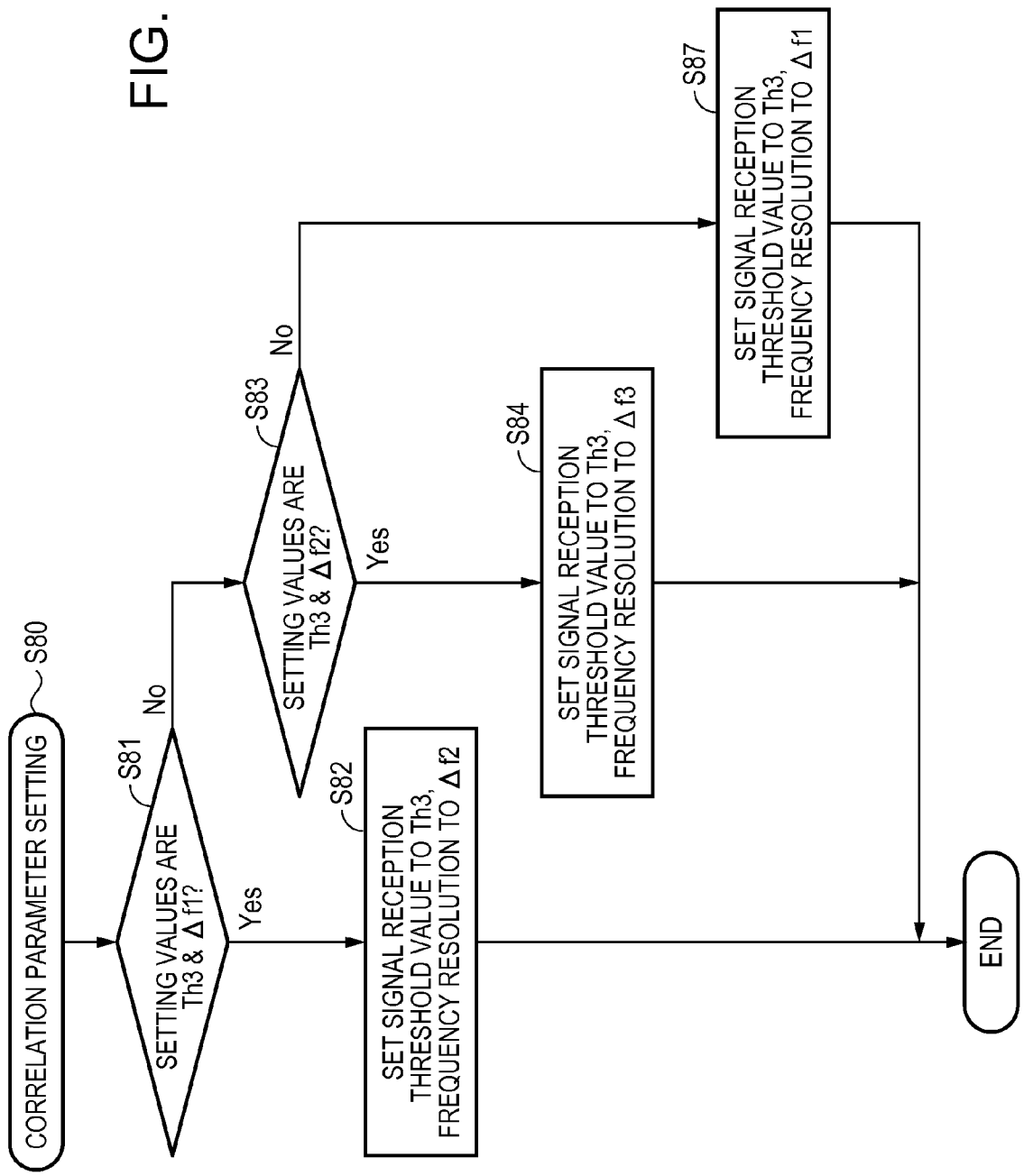
FIG. 12 is a flowchart showing a correlation parameter setting process in the receiving operation in the time measurement mode in a third embodiment of the invention.

Then, a third embodiment of the invention will be explained with reference to FIGS. 12 and 13. FIG. 12 shows a correlation parameter setting process S80 in the time measurement mode according to the third embodiment. It should be noted that also in the third embodiment, since the process in the positioning mode is the same as in the first embodiment, the explanation thereof will be omitted.

The time measurement mode according to the third embodiment is different from that of the first embodiment in the point that the signal reception threshold value Th is fixed to the third signal reception threshold value Th3.

Specifically, the correlation parameter setting section 15 sets the initial values of the correlation parameters in the time measurement mode to the third signal reception threshold value Th3 and the first frequency resolution Δf1. Then, in the correlation parameter setting process S80, if the setting values are the third signal reception threshold value Th3 and the first frequency resolution Δf1 (Yes in the step S81), the setting values are changed (step S82) to the third signal reception threshold value Th3 and the second frequency resolution Δf2.

Further, if the setting values are the third signal reception threshold value Th3 and the second frequency resolution Δf2 (Yes in the step S83), the setting values are changed (step S84) to the third signal reception threshold value Th3 and the third frequency resolution Δf3.

Further, if the determination of "No" has been made in the step S83, the setting values are changed (step S87) to the initial values, namely the third signal reception threshold value Th3 and the first frequency resolution Δf1.

Figure 13:
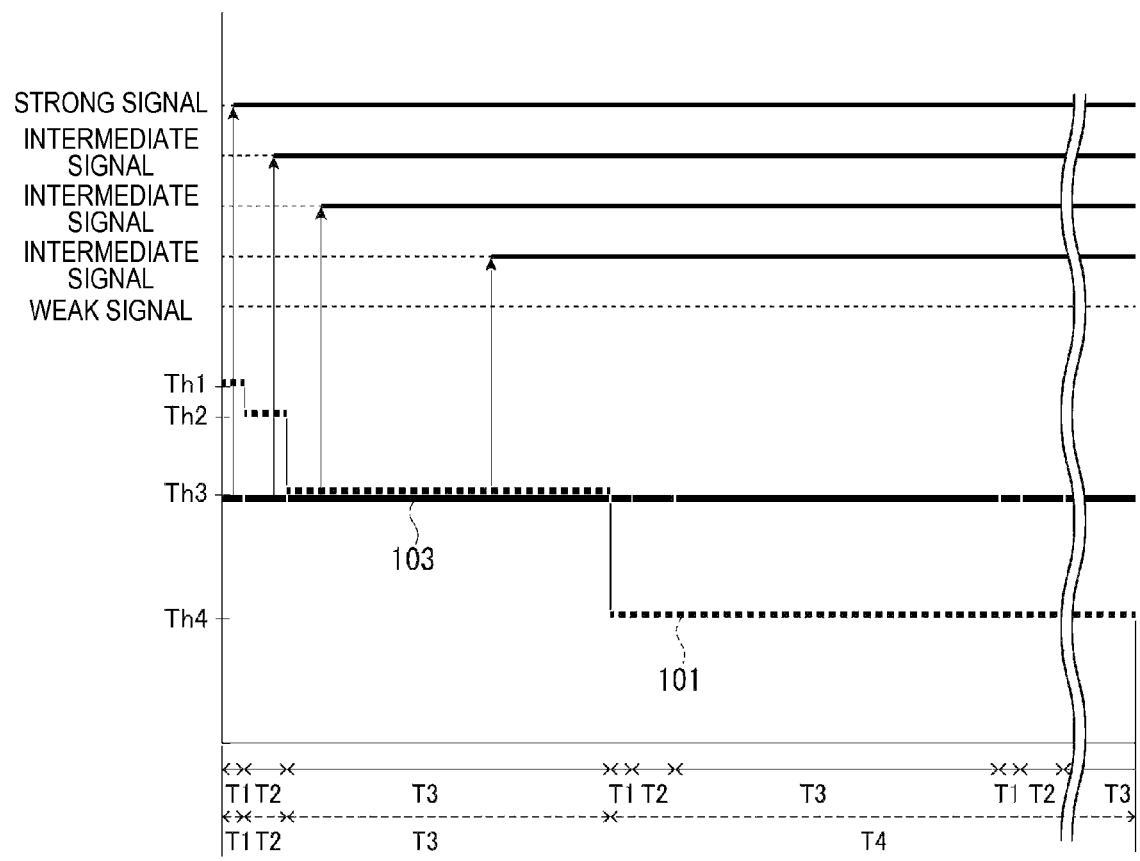
FIG. 13 is a timing chart showing a capture process of the satellite signal according to the third embodiment.

FIG. 13 shows the state of the search process in the third embodiment described above. As indicated by the solid line 103 shown in FIG. 13, in the time measurement mode of the third embodiment, although the signal reception threshold value Th is fixed to the third signal reception threshold value Th3, the frequency resolution Δf is changed sequentially from the first frequency resolution Δf1 to the third frequency resolution Δf3 similarly to the case of the first embodiment. Also in the third embodiment, the third frequency resolution Δf3 (=10 Hz) in the time measurement mode is set to a value larger than the minimum value of the frequency resolution settable in the positioning mode, namely the fourth frequency resolution Δf4 (=2 Hz).

According to the third embodiment described above, since the setting value is not set to the fourth frequency resolution Δf4, the cycle of the search process is short compared to the positioning mode, and the number of times of the search process of the satellite in a given period of time can be increased compared to the positioning mode. Therefore, since the search process of all of the GPS satellites 5 can be performed in about 1 through 15 seconds in the case in which the receiving process in the time measurement mode is performed, in the case in which the location has changed since the reception is performed while walking, the probability of capturing the GPS satellites 5 can be increased, and the acquisition probability of the time information can also be increased. Further, since the signal reception threshold value Th is fixed to the third signal reception threshold value Th3, the satellite signal equal to or stronger than an intermediate signal with an intermediate signal intensity can be captured in the time measurement mode although the satellite signal as a weak signal low in signal intensity cannot be captured. Therefore, in the case in which capturing of the satellite signal as the strong signal cannot be expected, there is a possibility of shortening the time taken to obtain the time information compared to the case of the first embodiment.

Therefore, the receiving time in the time measurement mode can be shortened to reduce the power consumption, and thus the operating time of the GPS watch 1 driven by the secondary battery 32 can also be further elongated.

It should be noted that the signal reception threshold value Th in the time measurement mode is fixed to the third signal reception threshold value Th3 in the third embodiment, but can also be fixed to other threshold values. It should be noted that if the threshold value is fixed to a large value, since the satellite signal high in signal intensity can only be captured, and therefore, the probability of capturing the satellite signal decreases. In contrast, if the threshold value is fixed to a small value, since the satellite signal weak in signal intensity can also be captured, the capturing probability increases. However, since the signal intensity is weak, the probability of failing to obtain the time information also increases. Therefore, it is preferable to set the threshold value taking the capturing probability of the satellite signal and the acquisition probability of the time information into consideration, and it is preferable to fix the threshold value to, for example, the second signal reception threshold value Th2 or the third signal reception threshold value Th3.

Modified Examples

It should be noted that the invention is not limited to each of the embodiments described above, but can be put into practice with various modifications within the scope or the spirit of the invention.

For example, the variation levels of the signal reception threshold value Th and the levels of the frequency resolution $\Delta f$ in the time measurement mode and the positioning mode are not limited to three levels or four levels. Specifically, it is sufficient to change the frequency resolution $\Delta f$ in at least two levels in the positioning mode, and in the time measurement mode, it is sufficient to change the frequency resolution $\Delta f$ in the number of levels at least one level smaller than that in the positioning mode.

Further, the specific values of the signal reception threshold value Th and the frequency resolution $\Delta f$ are not limited to those in the embodiments described above.

Further, the reception mode setting section 215 can also be configured so as to be able to set the reception mode of the GPS receiving section 10 to a date reception mode for obtaining the date information and a leap second information acquisition mode for obtaining the leap second information in addition to the time measurement mode and the positioning mode described above. Further, in the case in which the reception mode is set to the date reception mode or the leap second information acquisition mode, it is sufficient for the base band section 13 and the correlation parameter setting section 15 to perform the same capture process as in the case in which the reception mode is set to the positioning mode.

Further, although in the description of the above embodiments, the GPS satellites 5 are explained as an example of the positional information satellites, as the positional information satellite in the invention, besides the GPS satellites 5, there can also be adopted other global navigation satellite systems (GNSS) such as Galileo (EU), GLONASS (Russia), and BeiDou (China), and a positional information satellite for transmitting a satellite signal including the time information such as a geostationary satellite such as SBAS, and a quasi-zenith satellite.

The electronic timepiece according to the invention can be applied to an analog timepiece provided only with hands and a digital timepiece provided only with a display besides the combination timepiece provided with hands and a display. Further, in addition to a watch, the invention can also be applied to a variety of timepieces such as a pocket watch, and an electronic apparatus provided with a clock function such as a cellular phone, a digital camera, or a variety of personal digital assistances.

The entire disclosure of Japanese Patent Application Nos. 2013-178632, filed Aug. 29, 2013 and 2014-129466, filed Jun. 24, 2014 are expressly incorporated by reference herein.

What is claimed is:

1. An electronic timepiece comprising:
a receiving section, which captures a satellite signal emitted from a positional information satellite and receives the satellite signal, and is capable of obtaining at least one of time information and positioning information; and
a reception mode setting section adapted to selectively set a reception mode of the receiving section to at least a time measurement mode for obtaining the time information based on the satellite signal received, and a positioning mode for obtaining the positioning information and the time information based on the satellite signal received,
wherein the receiving section is provided with a correlation section adapted to perform a capture process of obtaining a correlation between a local code used to capture the satellite signal and the satellite signal received,
the correlation section is configured so that a frequency resolution, with which a predetermined frequency band is searched for a carrier frequency of the satellite signal, can be changed in a plurality of levels, and
a minimum value of the frequency resolution to be changed by the correlation section in a case in which the reception mode is set to the time measurement mode is set to a value larger than a minimum value of the frequency resolution to be changed by the correlation section in a case in which the reception mode is set to the positioning mode.

2. The electronic timepiece according to claim 1, wherein assuming that the satellite signal having a signal intensity one of equal to and higher than a signal reception threshold value is a capture target, n denotes an integer no smaller than two, and m denotes an integer no smaller than one and no larger than n,
the correlation section is configured so that
the frequency resolution can be changed in n levels from a first frequency resolution $\Delta f1$ as a maximum value to an $n^{th}$ frequency resolution $\Delta fn$ as a minimum value, and
the signal reception threshold value can be changed in n levels from a first signal reception threshold value Th1 as a maximum value to an $n^{th}$ signal reception threshold value Thn as a minimum value,
in a case in which the reception mode is set to the time measurement mode, the correlation section continues the capture process while changing a search state in m levels from a first search state in which the frequency resolution is set to the first frequency resolution $\Delta f1$, and the signal reception threshold value is set to the first signal reception threshold value Th1 to an $m^{th}$ search state in which the frequency resolution is set to the $m^{th}$ frequency resolution $\Delta fm$, which is larger than the $n^{th}$ frequency resolution $\Delta fn$, and the signal reception threshold value is set to the $m^{th}$ signal reception threshold value Thm, which is higher than the $n^{th}$ signal reception threshold value Thn until a capture termination condition of the satellite signal is fulfilled, and
in a case in which the capture termination condition of the satellite signal fails to be fulfilled when the capture process in the m$^{th}$ search state ends, the correlation section repeats the capture process from the first search state.

3. The electronic timepiece according to claim 1, wherein assuming that the satellite signal having a signal intensity one of equal to and higher than a signal reception threshold value is a capture target, n denotes an integer no smaller than two, and m denotes an integer no smaller than one and no larger than n, the correlation section is configured so that
the frequency resolution can be changed in n levels from a first frequency resolution Δf1 as a maximum value to an n$^{th}$ frequency resolution Δfn as a minimum value, and
the signal reception threshold value can be changed in n levels from a first signal reception threshold value Th1 as a maximum value to an n$^{th}$ signal reception threshold value Thn as a minimum value, in a case in which the reception mode is set to the time measurement mode, the correlation section continues the capture process while fixing the frequency resolution to the m$^{th}$ frequency resolution Δfm, and changing a search state in n levels from a first search state in which the signal reception threshold value is set to the first signal reception threshold value Th1 to an n$^{th}$ search state in which the signal reception threshold value is set to the n$^{th}$ signal reception threshold value Thn until a capture termination condition of the satellite signal is fulfilled, and in a case in which the capture termination condition of the satellite signal fails to be fulfilled when the capture process in the n$^{th}$ search state ends, the correlation section repeats the capture process from the first search state.

4. The electronic timepiece according to claim 1, wherein assuming that the satellite signal having a signal intensity one of equal to and higher than a signal reception threshold value is a capture target, n denotes an integer no smaller than two, and m denotes an integer no smaller than one and no larger than n, the correlation section is configured so that
the frequency resolution can be changed in n levels from a first frequency resolution Δf1 as a maximum value to an n$^{th}$ frequency resolution Δfn as a minimum value, and
the signal reception threshold value can be changed in n levels from a first signal reception threshold value Th1 as a maximum value to an n$^{th}$ signal reception threshold value Thn as a minimum value, in a case in which the reception mode is set to the time measurement mode, the correlation section continues the capture process while fixing the signal reception threshold value to the m$^{th}$ signal reception threshold value Thm, and changing a search state in m levels from a first search state in which the frequency resolution is set to the first frequency resolution Δf1 to an m$^{th}$ search state in which the frequency resolution is set to the m$^{th}$ frequency resolution Δfm, which is larger than the n$^{th}$ frequency resolution Δfn, until a capture termination condition of the satellite signal is fulfilled, and in a case in which the capture termination condition of the satellite signal fails to be fulfilled when the capture process in the m$^{th}$ search state ends, the correlation section repeats the capture process from the first search state.

5. The electronic timepiece according to claim 2, wherein in a case in which the reception mode is set to the positioning mode, the correlation section continues the capture process while changing the search state in n levels from the first search state in which the frequency resolution is set to the first frequency resolution Δf1, and the signal reception threshold value is set to the first signal reception threshold value Th1 to an n$^{th}$ search state in which the frequency resolution is set to the n$^{th}$ frequency resolution Δfn, and the signal reception threshold value is set to the n$^{th}$ signal reception threshold value Thn until the capture termination condition of the satellite signal is fulfilled, and in a case in which the capture termination condition of the satellite signal fails to be fulfilled when the capture process in the n$^{th}$ search state ends, the correlation section repeats the capture process from the first search state.

6. The electronic timepiece according to claim 5, wherein the reception mode setting section is configured so as to be able to set the reception mode of the receiving section to a date reception mode for obtaining date information and a leap second information acquisition mode for obtaining leap second information in addition to the time measurement mode and the positioning mode, and in a case in which the reception mode is set to one of the date reception mode and the leap second acquisition mode, the correlation section performs the same capture process as in the case in which the reception mode is set to the positioning mode.

7. An electronic timepiece comprising:
a receiving section, which captures a satellite signal emitted from a positional information satellite and receives the satellite signal, and is capable of obtaining at least one of time information and positioning information; and
a reception mode setting section adapted to set a reception mode of the receiving section to at least a time measurement mode of obtaining time information based on the satellite signal received,
wherein the receiving section is provided with a correlation section adapted to perform a capture process of obtaining a correlation between a local code used to capture the satellite signal and the satellite signal received,
the correlation section is configured so that a frequency resolution, with which a predetermined frequency band is searched for a carrier frequency of the satellite signal, can be changed in a plurality of levels, and
a minimum value of the frequency resolution to be changed by the correlation section in a case in which the reception mode is set to the time measurement mode is set to a value larger than a smallest settable value of the frequency resolution.

8. The electronic timepiece according to claim 7, wherein the correlation section is configured so as to be able to change the frequency resolution in four levels including a first setting value, a second setting value smaller than the first setting value, a third setting value smaller than the second setting value, and a fourth setting value smaller than the third setting value, in a case in which the reception mode is set to the time measurement mode, the correlation section performs the capture process while changing the frequency resolution sequentially to the first setting value, the second setting value, and the third setting value in this order until a capture termination condition of the satellite signal is fulfilled, and in a case in which the capture termination condition of the satellite signal fails to be fulfilled when the capture process with the third setting value ends, the correlation section repeats the capture process from a state in which the frequency resolution is set to the first setting value.

9. The electronic timepiece according to claim 1, further comprising:
   a solar cell adapted to receive light to generate electric power; and
   a power generation amount detector adapted to detect a power generation amount in the solar cell,
   wherein the receiving section begins the capture process of the satellite signal in the time measurement mode in a case in which the power generation amount detected by the power generation amount detector is no smaller than a predetermined value.

* * * * *